United States Patent
Sueishi

(10) Patent No.: US 9,639,302 B2
(45) Date of Patent: May 2, 2017

(54) PREVENTION OF DISPLAY OVERLAP IN A USER INTERFACE FOR AN IMAGE FORMING APPARATUS

(71) Applicant: Taijirou Sueishi, Kanagawa (JP)

(72) Inventor: Taijirou Sueishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/966,419

(22) Filed: Dec. 11, 2015

(65) Prior Publication Data

US 2016/0188263 A1    Jun. 30, 2016

(30) Foreign Application Priority Data

Dec. 24, 2014  (JP) .................................. 2014-260113

(51) Int. Cl.
G06F 3/12       (2006.01)
G06F 9/44       (2006.01)
G06F 3/0481     (2013.01)

(52) U.S. Cl.
CPC .......... G06F 3/1205 (2013.01); G06F 3/0481 (2013.01); G06F 3/1253 (2013.01); G06F 8/38 (2013.01); G06F 9/4443 (2013.01); G06F 9/4446 (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0133839 A1* | 6/2006 | Bardolatzy | ........... | G06F 3/1205 399/81 |
| 2010/0110480 A1* | 5/2010 | Satake | .................. | G06F 9/4443 358/1.15 |
| 2012/0020682 A1* | 1/2012 | Ikeda | ..................... | G03G 15/55 399/24 |
| 2012/0079411 A1* | 3/2012 | Tani | ..................... | G03G 15/502 715/773 |
| 2013/0326526 A1 | 12/2013 | Sasaki et al. | | |
| 2014/0022598 A1* | 1/2014 | Neeleman | ............. | G06F 3/1205 358/1.15 |
| 2014/0185090 A1* | 7/2014 | Ohata | .................. | G06K 15/002 358/1.15 |
| 2014/0293338 A1* | 10/2014 | Murakami | ......... | H04N 1/00413 358/1.15 |

FOREIGN PATENT DOCUMENTS

JP  4895613  3/2012

* cited by examiner

Primary Examiner — Henok A Shiferaw
(74) Attorney, Agent, or Firm — Duft Bornsen & Fettig LLP

(57) ABSTRACT

An information processing apparatus includes an acquisition unit configured to acquire status information of an image forming apparatus; and an information display unit configured to constantly display the status information of the image forming apparatus in a first region on a display device, to display setting information regarding image processing to be performed in the image forming apparatus in a second region on the display device, the second region being adjacent to the first region, and to display a relation display element related to the setting information at a position so as not to overlap the relation display element with the first region.

18 Claims, 28 Drawing Sheets

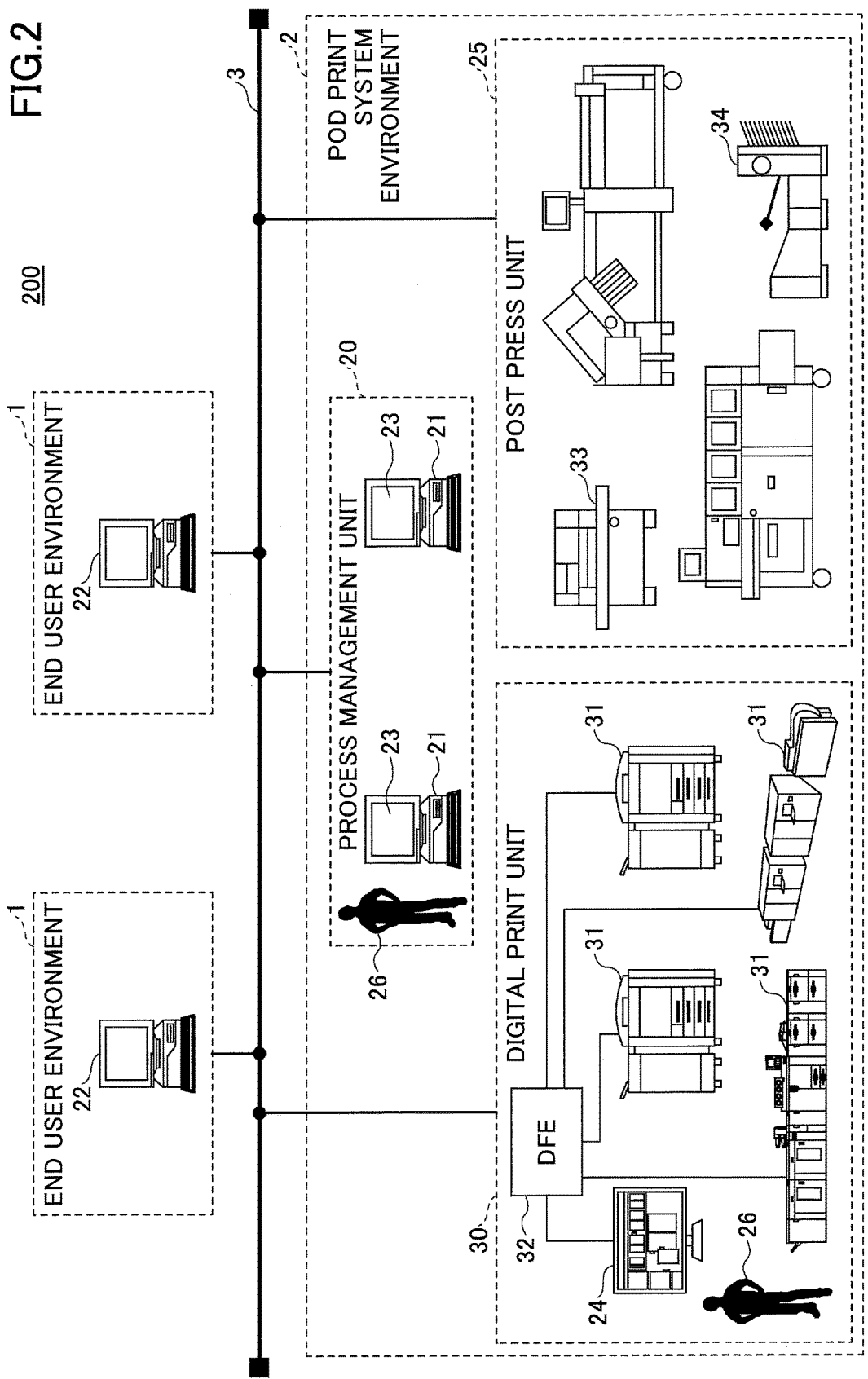

FIG.6

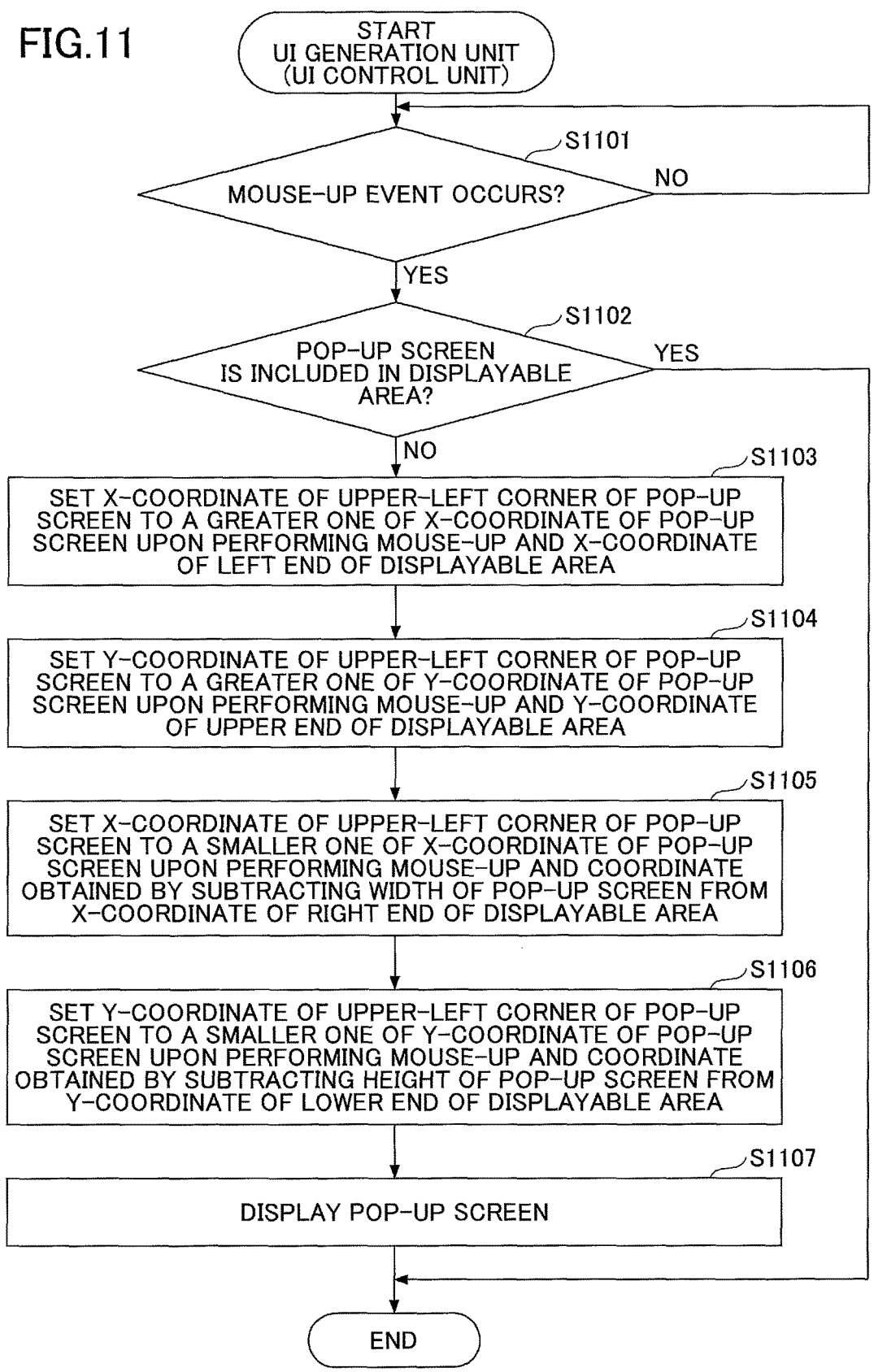

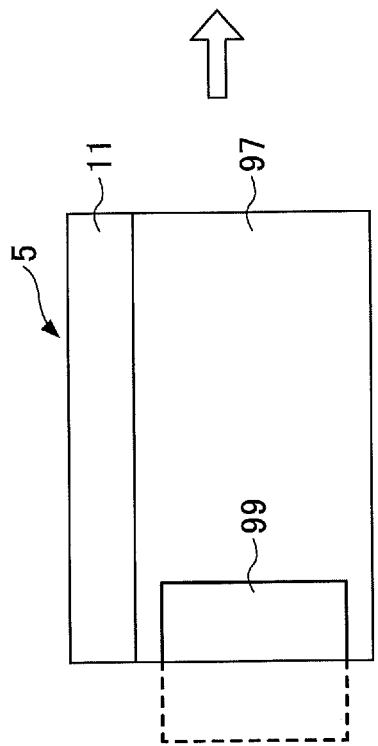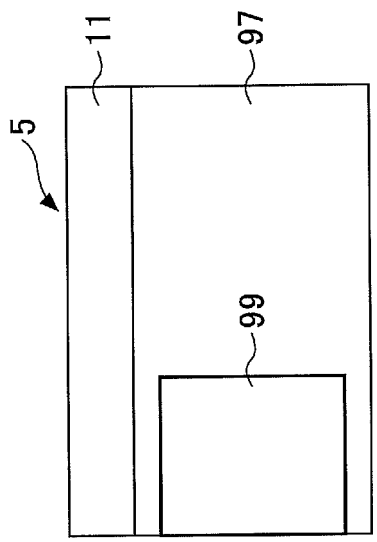
FIG.14A
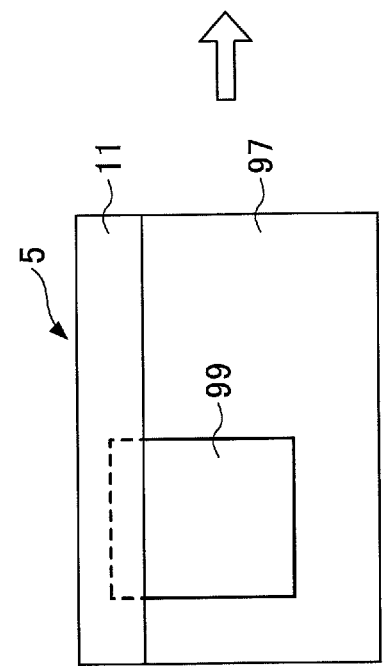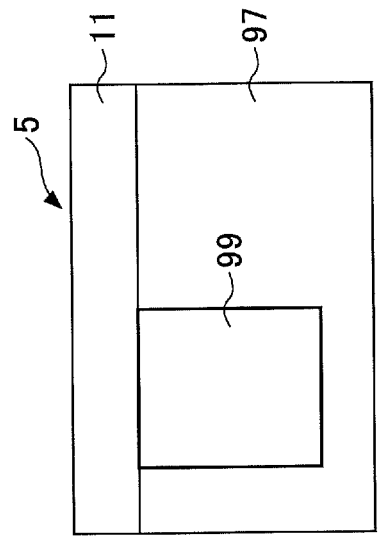
FIG.14B

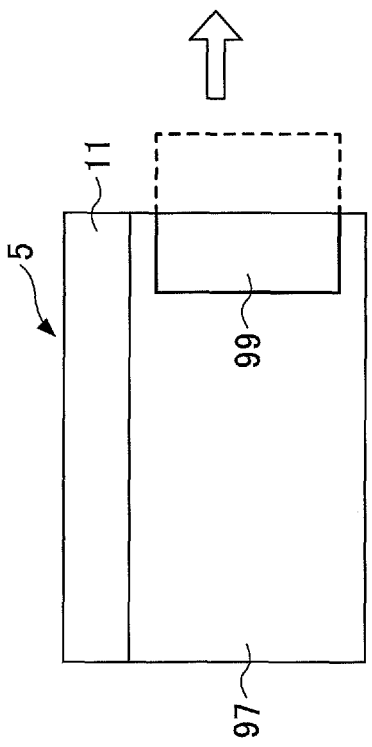
FIG.14C
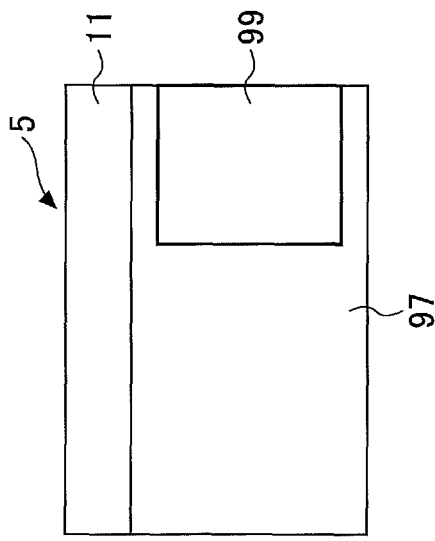
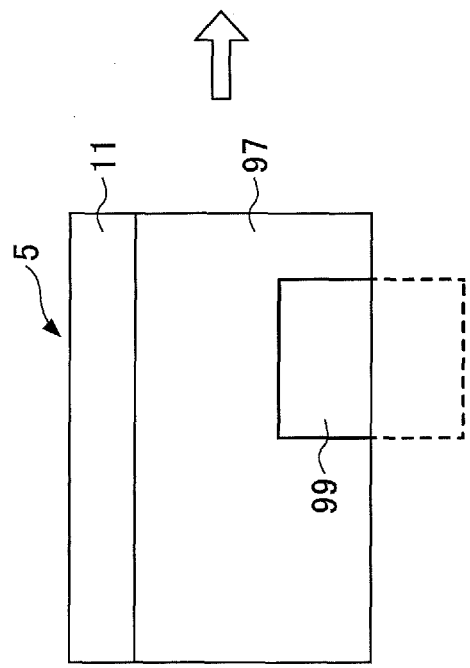
FIG.14D
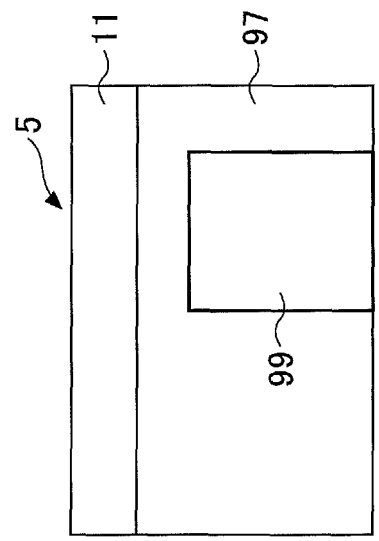

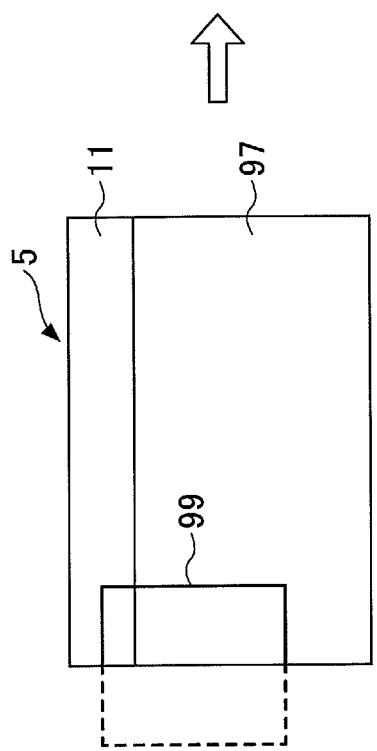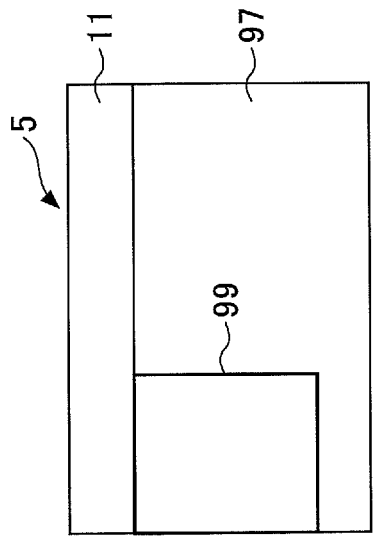
FIG. 15A
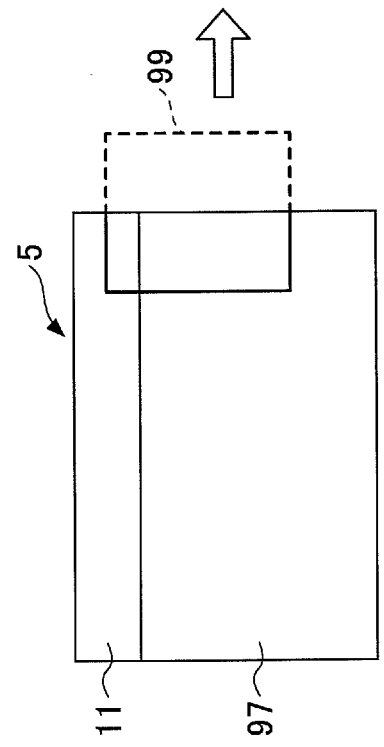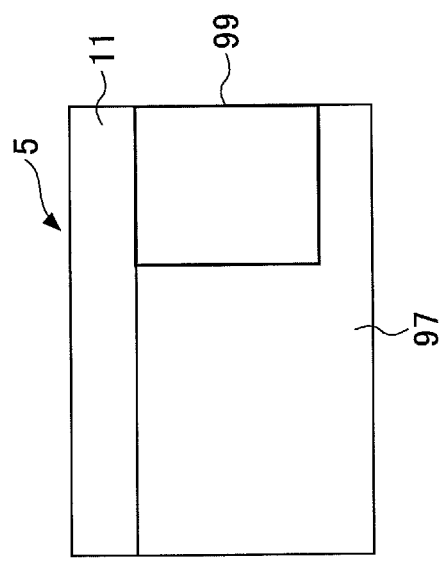
FIG. 15B

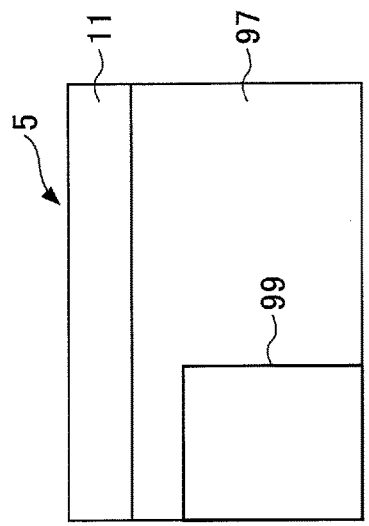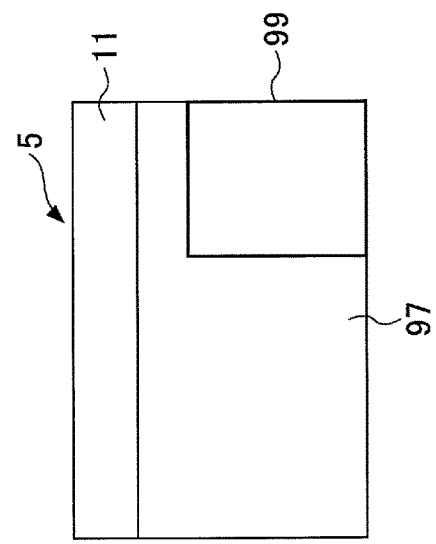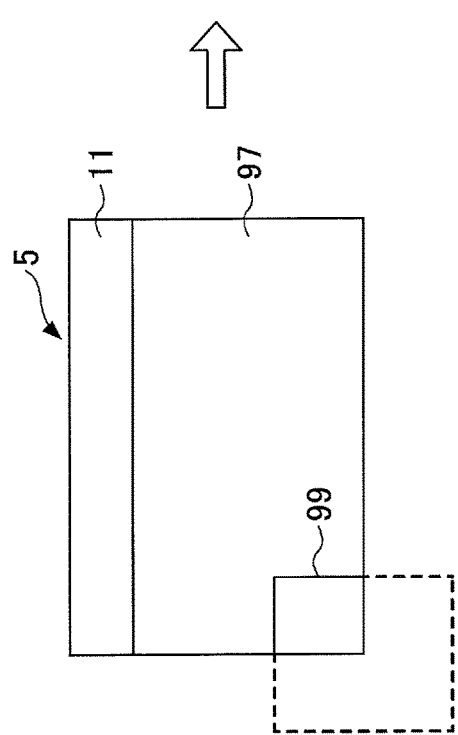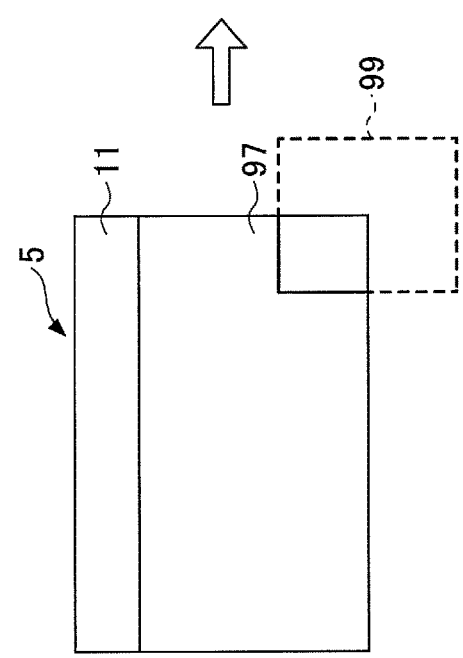
FIG.15C
FIG.15D

FIG.16A

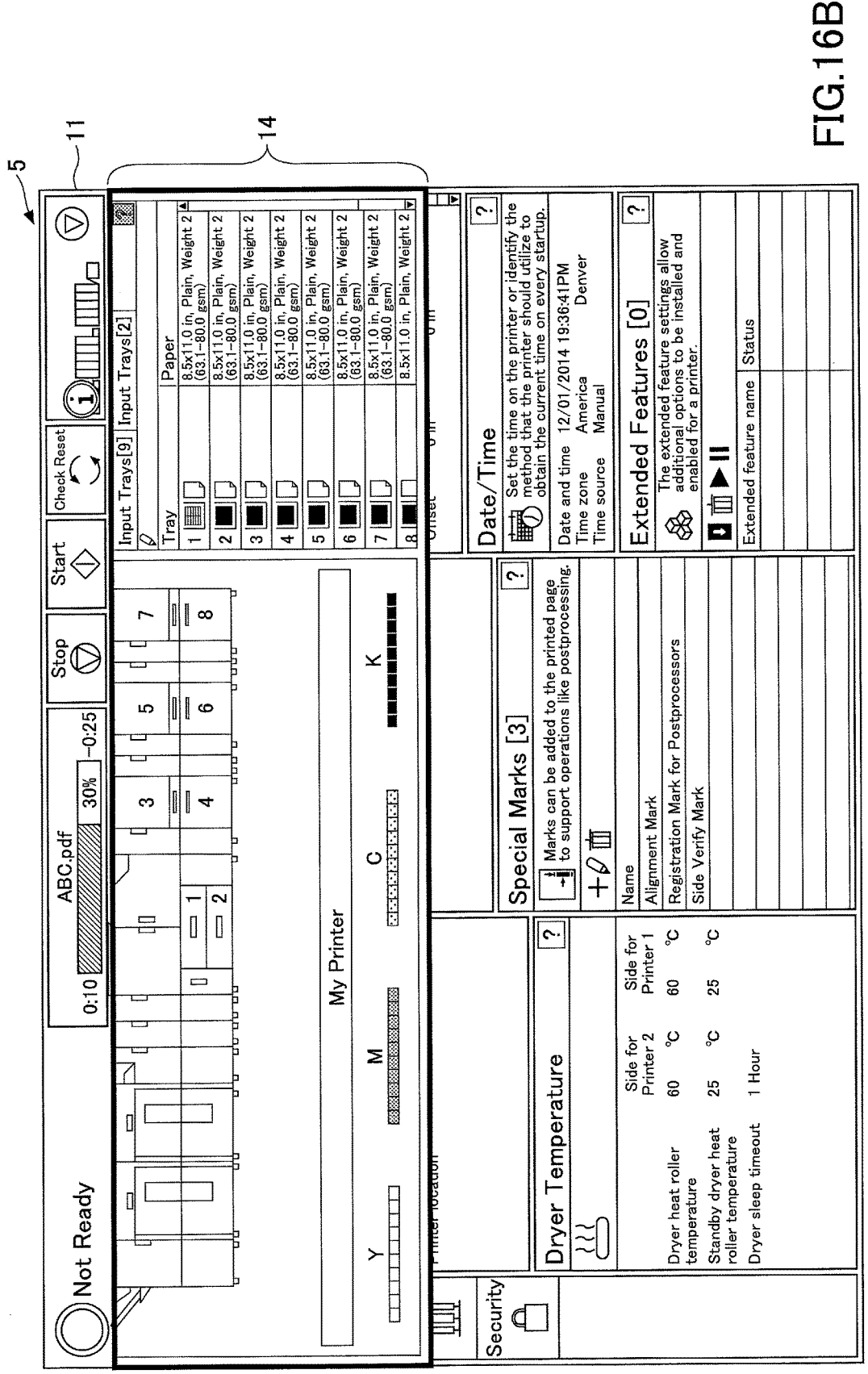

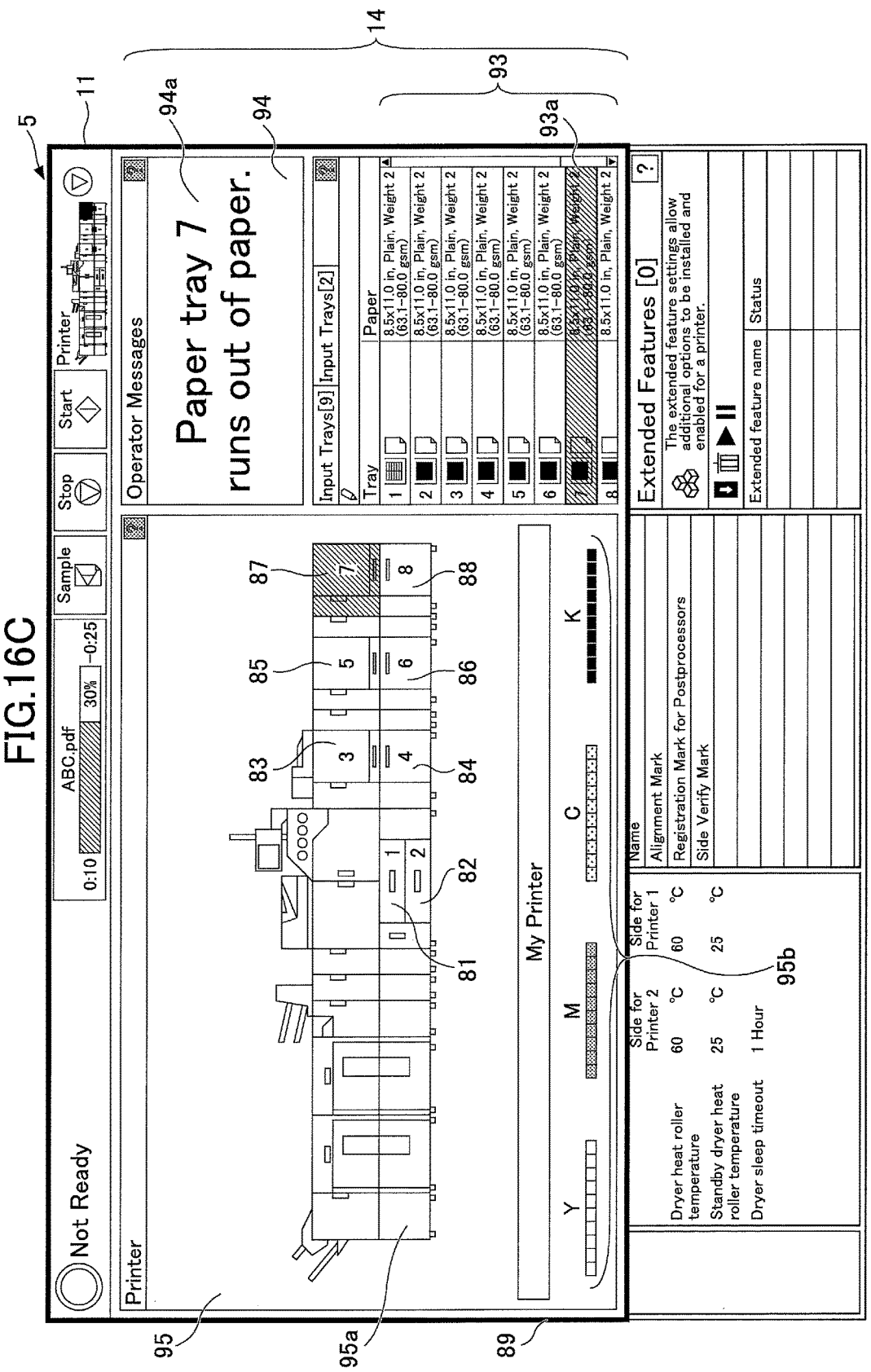

FIG. 17A

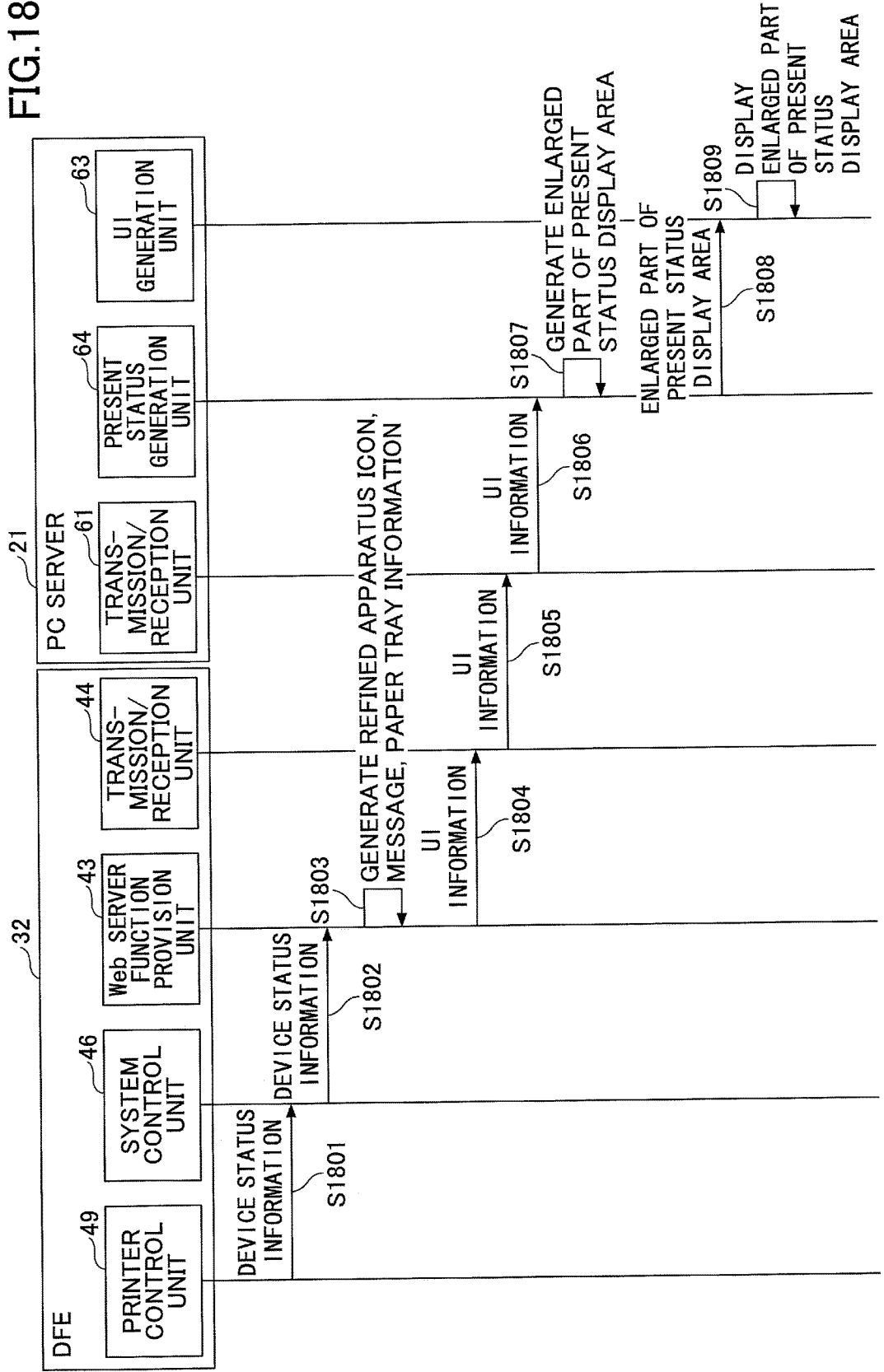

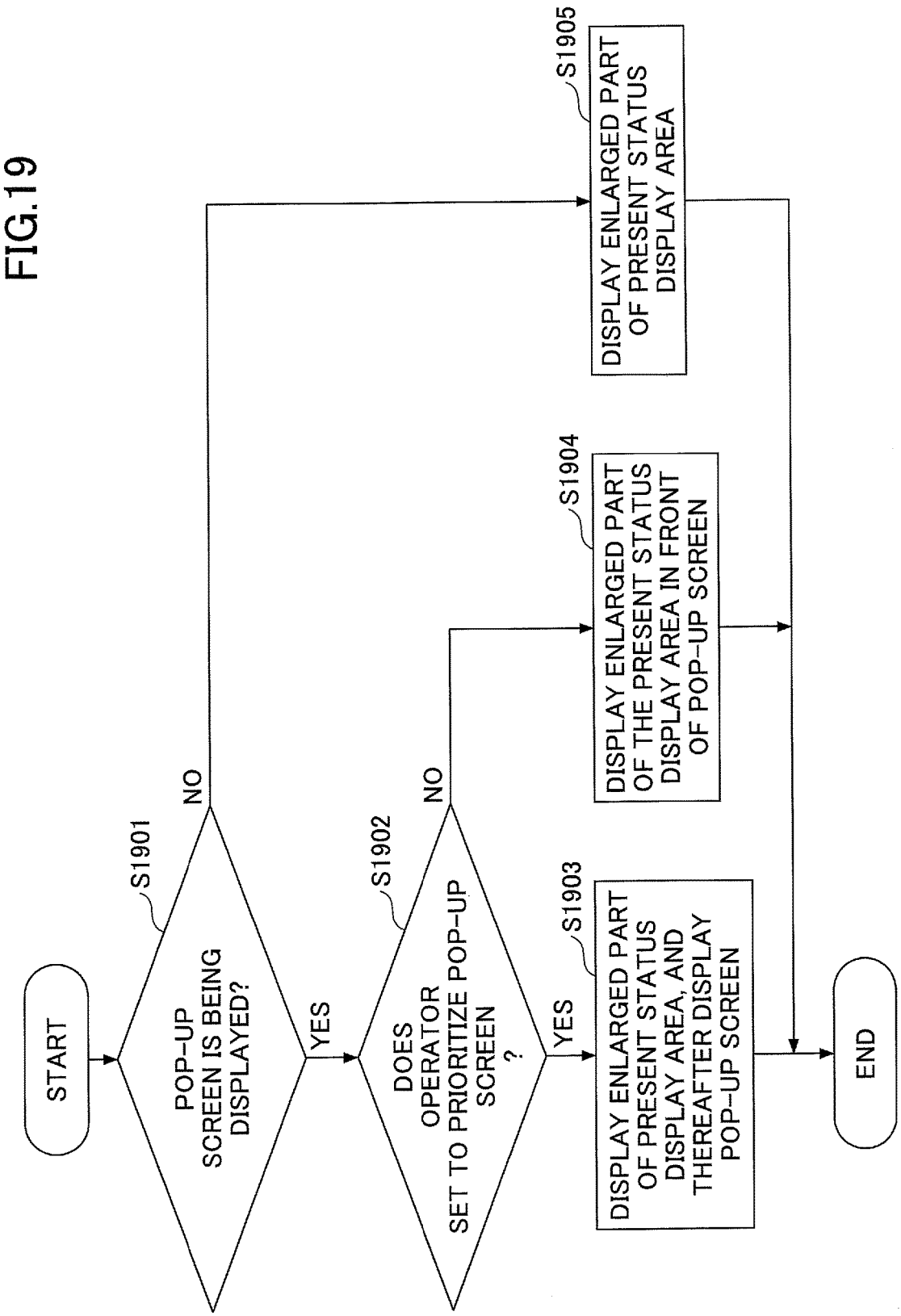

FIG. 20A RELATED ART

PREVENTION OF DISPLAY OVERLAP IN A USER INTERFACE FOR AN IMAGE FORMING APPARATUS

CROSS-REFERENCE TO RELATED APPLICATIONS

The present application claims priority under 35 U.S.C. §119 to Japanese Patent Application No. 2014-260113, filed Dec. 24, 2014. The contents of this application are incorporated herein by reference in their entirety.

BACKGROUND OF THE INVENTION

1. Field of the Invention

The disclosures herein generally relate to an information processing apparatus, a computer readable recording medium storing a program for causing a computer to execute a process and a user interface.

2. Description of the Related Art

For an image forming apparatus having a function such as a printer, an operator sets a print condition or the like from a user interface (in the following, referred to as "UI") provided by the image forming apparatus. Moreover, in an image forming apparatus for so-called commercial printing which prints a large amount of documents for business use and binds books (an image forming apparatus suitable for production printing), the UI is not only used for setting print conditions but also utilized for managing a work flow, in which print processes for a print job are defined.

In the above-described image forming apparatuses, in association with introduction of higher functions, information that can be managed increases, and information to be displayed on the UI also increases. However, information that can be displayed on one UI at a time is restricted. Conventionally, a UI which takes account of operability and convenience for the operator has been studied (for example, see Japanese Patent No. 4895613). Japanese Patent No. 4895613 discloses an image forming apparatus that can display by switching between a basic screen and a simple screen, which is different from the basic screen and displays operation condition items, a number of which is less than that displayed in the basic screen. Moreover, Japanese Patent No. 4895613 describes displaying a simplified screen as a pop-up screen by the operator selecting input keys displayed on the basic screen. Since detailed items related to the input keys are displayed on the pop-up screen, the operator becomes able to utilize information with display size greater than an area of a display device.

SUMMARY OF THE INVENTION

It is a general object of at least one embodiment of the present invention to provide an information processing apparatus, a computer-readable recording medium storing a program for causing a computer to execute a process and a user interface that substantially obviate one or more problems caused by the limitations and disadvantages of the related art.

In one embodiment, an information processing apparatus includes an acquisition unit configured to acquire status information of an image forming apparatus; and an information display unit configured to constantly display the status information of the image forming apparatus in a first region on a display device, to display setting information regarding image processing to be performed in the image forming apparatus in a second region on the display device, the second region being adjacent to the first region and to display a relation display element related to the setting information at a position so as not to overlap the relation display element with the first region.

In another embodiment, a non-transitory computer-readable storage medium stores a program for causing a computer of an information processing apparatus to execute a process of constantly displaying on a display device status information of an image forming apparatus. The process includes acquiring the status information of the image forming apparatus; displaying constantly the status information of the image forming apparatus in a first region on the display device; displaying setting information regarding image processing to be performed in the image forming apparatus in a second region on the display device, the second region being adjacent to the first region; and displaying a relation display element related to the setting information at a position so as not to overlap the relation display element with the first region.

In yet another embodiment, a user interface for constantly indicating status information of an image forming apparatus, includes a first display element, in which setting information regarding image processing to be performed in the image forming apparatus is displayed; a second display element, in which the status information of the image forming apparatus is constantly displayed; and a third display element, which is related to the setting information displayed in the first display element, and is displayed overlapped with the first display element but not overlapped with the second display element.

BRIEF DESCRIPTION OF THE DRAWINGS

Other objects and further features of embodiments will become apparent from the following detailed description when read in conjunction with the accompanying drawings, in which:

FIGS. 1A and 1B are diagrams for schematically explaining an example of a user interface of an image forming apparatus according to a present embodiment;

FIG. 2 is a diagram illustrating an example of a whole configuration of a print system according to the present embodiment;

FIG. 6 is a diagram illustrating an example of the UI according to the present embodiment;

FIG. 11 is a flowchart illustrating an example of a procedure of the UI generation unit or the UI control unit for displaying the moved pop-up screen according to the present embodiment;

FIGS. 14A to 14D are diagrams for schematically explaining an example of a relation between a position of the pop-up screen upon mouse up and a position of the pop-up screen displayed in the UI according to the present embodiment;

FIGS. 15A to 15D are diagrams for schematically explaining another example of the relation between the position of the pop-up screen upon mouse up and the position of the pop-up screen displayed in the UI according to the present embodiment;

FIGS. 16A to 16C are diagrams for schematically explaining an example of a transition of a present status display area according to the present embodiment;

FIGS. 17A to 17C are diagrams illustrating an example of the present status display area displayed enlarged while displaying the pop-up screen according to the present embodiment;

FIG. 18 is a sequence diagram illustrating an example of a procedure of the print system for displaying the present status display area displayed enlarged according to the present embodiment;

FIG. 19 is a flowchart illustrating an example of a procedure of the UI generation unit for displaying an enlarged part of the present status display area on the UI according to the present embodiment; and FIGS. 20A and 20B are diagrams for explaining an example of inconvenience caused by the pop-up screen according to the related art.

DESCRIPTION OF THE PREFERRED EMBODIMENTS

Figure 3:
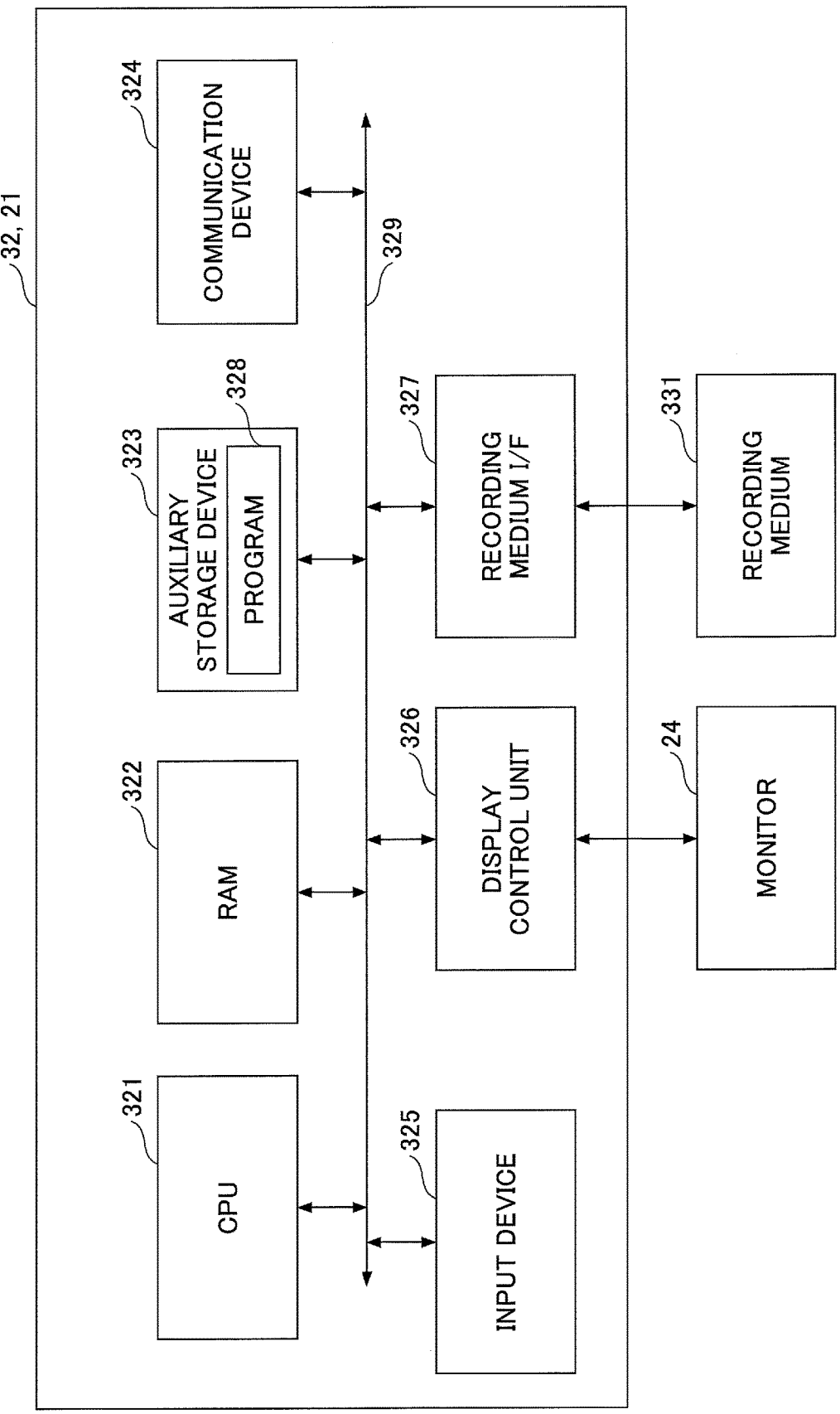
FIG. 3 is a diagram illustrating an example of a hardware configuration of a DFE (Digital Front End) according to the present embodiment.

In the following, embodiments of the present invention will be described with reference to the accompanying drawings.

<Outline of a User Interface of an Image Forming Apparatus According to a Present Embodiment>

Figure 1A:
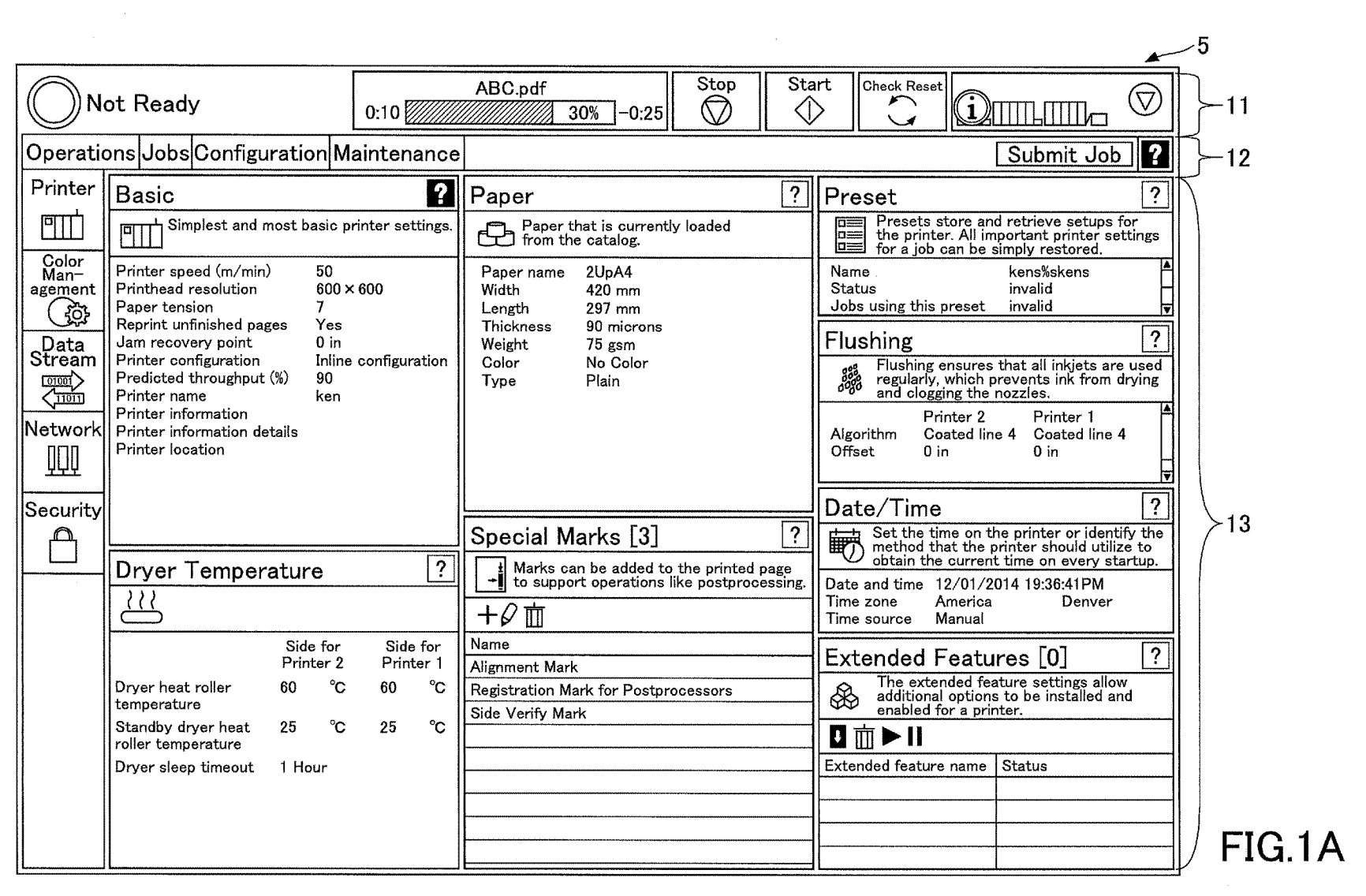
Figure 1B:
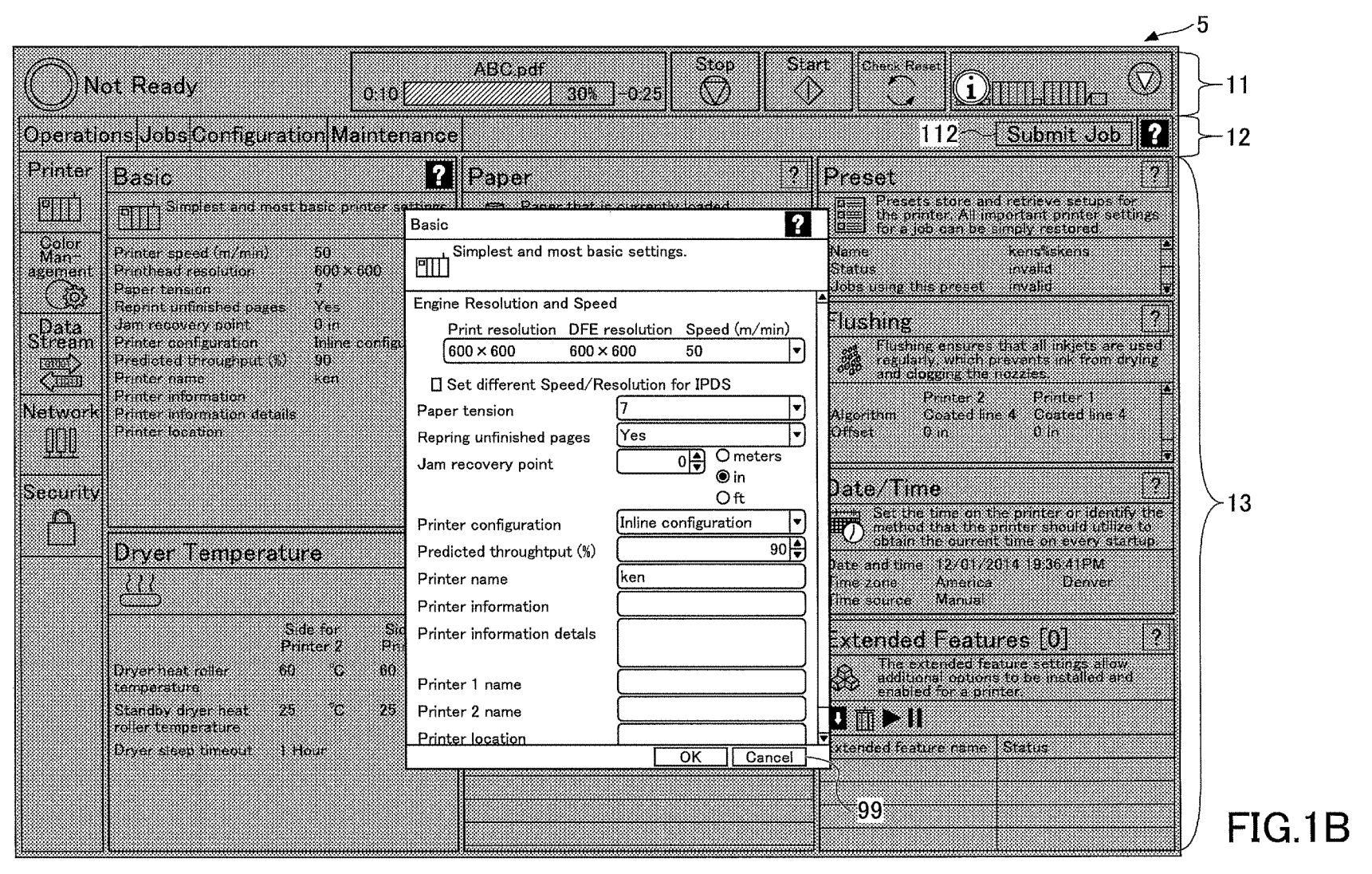

FIGS. 1A and 1B are diagrams for schematically explaining an example of the user interface of the image forming apparatus according to the present embodiment. As shown in FIG. 1A, the user interface (in the following, referred to as "UI") 5 of the image forming apparatus according to the present embodiment mainly includes three areas, i.e. a present status display area 11 for displaying a present status of the image forming apparatus, a screen transition menu display area 12 and a various information display area 13. The present status display area 11 in the upper stage, the screen transition menu display area 12 in the middle stage and the various information display area 13 in the lower stage are adjacent to each other.

Then, in the present embodiment, the present status display area 11 is an area for displaying the present status of the image forming apparatus and is not hidden by a pop-up screen 99.

FIG. 1B is a diagram illustrating an example of the UI 5 in which the pop-up screen 99 is displayed. The pop-up screen 99 is displayed not to overlap the present status display area 11.

Therefore, by the UI 5 according to the present embodiment, an operator of the image forming apparatus can constantly perceive the present status of the image forming apparatus.

Meanwhile, "constantly" means that the present status display area 11 is always displayed without being hidden. However, it may be hidden temporarily or transiently, such as in the middle of a screen transition. Moreover, it may be hidden by a pointing device such as a mouse cursor.

<Configuration Example>

FIG. 2 is a diagram illustrating an example of a whole configuration of a print system 200. The print system 200 assumes so-called commercial printing which prints a large amount of documents for business use and binds books (production printing). The print system 200 according to the present embodiment includes one or more end user environments 1 coupled via a network 3, such as a LAN (Local Area Network) or the Internet, and a POD (Print On Demand) print system environment 2.

In the end user environment 1 a client PC 22 is arranged. The client PC 22, in which a work flow application for a POD print task is installed, receives an operation by a user and generates a print job.

The client PC 22 has a collective printing function for pasting a plurality of logical page images on a paper face (Number Up imposition function) and an image editing function for adding a header, a footer, a page number or the like. Moreover, the client PC 22 can assign an instruction such as punching, stapling or the like. These instructions or settings are described in a JDF (Job Definition Format). The JDF may be referred to as a job ticket, an operating instruction, a print instruction or the like.

The POD print system environment 2 includes a process management unit 20, a digital print unit 30 and a post press unit 25, which are coupled via the network 3. The process management unit 20 controls an operation of each process of the digital print unit 30 and the post press unit 25 in the POD print system environment 2, to unify management of a work flow of the POD print system environment 2.

Meanwhile, the illustrated configuration is an example. The print system 200 may not include the independent process management unit 20, which is integrated with the digital print unit 30 or with the post press unit 25.

The process management unit 20 receives a print job from the end user environment 1 and stores the print job. The print job includes a JDF and a PDL (Page Description Language). In the JDF, various print conditions are described, as described above. On the other hand, in the PDL are image data which are objects to be printed. Meanwhile, the PDL originally meant a language for describing drawing contents of a page image (a rasterized image). But, in the present embodiment, the PDL means data described in the PDL. The PDL includes, PDF (Portable Document Format), Postscript, PCL (Printer Control Language), RPDL (Ricoh Page Description Language) or the like.

Moreover, the process management unit 20 includes a PC server 21. The PC server 21 receives an operation by the operator 26, to construct an operation in each process as a work flow based on the print job sent from the end user environment 1, or to perform scheduling efficiently for the operations of the digital print unit 30 or the post press unit 25. A status of the digital print unit 30 or the post press unit 25 is sent to the PC server 21, thereby the operator 26 can confirm a progress status of each print job in the work flow, presence/absence of an error or the like.

After the setting of the work flow is performed, the PC server 21 sends the print job to the digital print unit 30 to perform printing. Moreover, print pieces are conveyed to the post press unit 25, and are bound or the like by the post press unit 25 according to the instruction from the PC server 21. Meanwhile, the print job may be sent directly to the post press unit 25 from the digital print unit 30.

The digital print unit 30 is configured to include various image forming apparatuses (a printer for production, a high-speed color ink-jet printer or a printer apparatus such as a color/monochrome MFP (Multi-Functional Peripheral) 31. In the digital print unit 30, the DFE (Digital Front End) 32 is arranged. The DFE 32 is also referred to as a printer control device or an image processing device, and control printing by the image forming apparatus 31. The DFE 32 may be separated from the image forming apparatus 31, as shown in FIG. 2, or may be integrated with the image forming apparatus 31. The DFE 32 acquires the print job from the process management unit 20, generates drawing data (raster data) for the image forming apparatus for commercial printing 31 forming a toner image or an image by ink using the JDF and the PDL, and sends the drawing data to the image forming apparatus 31.

A monitor 24 may be coupled to the DFE 32. On the monitor 24, the same UI 5 as the UI 5 which the PC server 21 displays on a display device 23, is displayed. In this case, the operator 26 can confirm the progress status of each print job in the work flow, presence/absence of an error or the like by watching the monitor 24. Meanwhile, the monitor 24 or the display device 23 is an example of the display device.

Meanwhile, the digital print unit 30 may include the image forming apparatus 31 directly coupled to a finisher (a post-processing device) for performing a post-treatment (post-processing), such as paper folding, saddle stitching book binding, case binding or punching, for a printed recording paper.

The post press unit 25 includes a post-processing device, such as a paper folding device, a saddle stitching book binding device, a case binding device, a cutting device, a sealing device or a gathering device, according to an operation instruction for a print piece (post press job) received from the process management unit 20. Moreover, the post press unit 25 executes a finishing treatment, such as paper folding, saddle stitching book binding, case binding, cutting, sealing or gathering. The post press unit 25 includes a post-processing device for performing a post-treatment (post-processing) after digital printing, such as a stapler 33, a hollow punching device 34 or the like.

<Configuration of the PC Server and the DFE>

FIG. 3 is a diagram illustrating an example of hardware configuration of the DFE 32. The DFE 32 has a function as an information processing apparatus (computer). The DFE 32 includes a CPU (Central Processing Unit) 321, a RAM (Random Access Memory) 322, an auxiliary storage device 323, a communication device 324, an input device 325, a display control unit 326 and a recording medium I/F 327, which are coupled with each other via a bus 329.

The CPU 321 executes a program 328 using the RAM 322 as a work memory, to control the whole DFE 32. The auxiliary storage device 323 is a non-volatile memory, such as a HDD (Hard Disk Drive) or a SSD (Solid State Drive). The auxiliary storage device 323 stores, in addition to the program 328 having a function which will be described later, an OS (Operating System), a print job and various types of data.

The communication device 324 is a modem, a LAN card or the like, and is coupled to the network 3 to communicate with the end user environment 1, the process management unit 20 or the post press unit 25. The communication may be performed wirelessly or by wire. Moreover, the DFE 32 may communicate with the image forming apparatus 31 via the communication device 324 or may communicate with the image forming apparatus 31 via a cable (dedicated line) such as a USB (Universal Serial Bus).

The input device 325 is a keyboard or a mouse, which receives an operation or an input by the operator. The keyboard includes a plurality of keys for receiving characters, values, various types of instructions or the like, and receives inputs from them. The mouse receives a move of a mouse pointer, selection or execution of various types of instructions, selection of a processing object and the like.

The display control unit 326 is coupled to the monitor 24, and displays the UI 5 on the monitor 24 according to an instruction from the CPU 321. Meanwhile, in a case where a touch panel is formed in the monitor 24, the touch panel can receive a selection or the like of items of the UI 5 displayed on the monitor 24.

The recording medium I/F 327 can attach or detach a portable recording medium, and write data into the recording medium 331 and read out data from the recording medium 331 according to an instruction from the CPU 321. For the recording medium 331, various types of media can be used, including, for example, a medium which records optically, electrically or magnetically, such as an optical disk, a USB memory or an SD (Secure Digital) card (trademark registered), a semiconductor memory which records information electrically, such as a flash memory, or the like.

Meanwhile, the program 328 is a file in an installable format or an executable format, and is distributed in a state stored in the recording medium 331 or distributed by being downloaded from a server for delivering program via the network 3.

In the present embodiment, not only the DFE 32, but also the PC server 21 in FIG. 2 or an arbitrary information processing apparatus, which can be coupled to the network 3, can display the UI 5. However, hardware configuration diagram of the PC server 21 and the arbitrary information processing apparatus can be realized by the same configuration as FIG. 3.

<Regarding Functions of the DFE and the PC Server>

Figure 4:
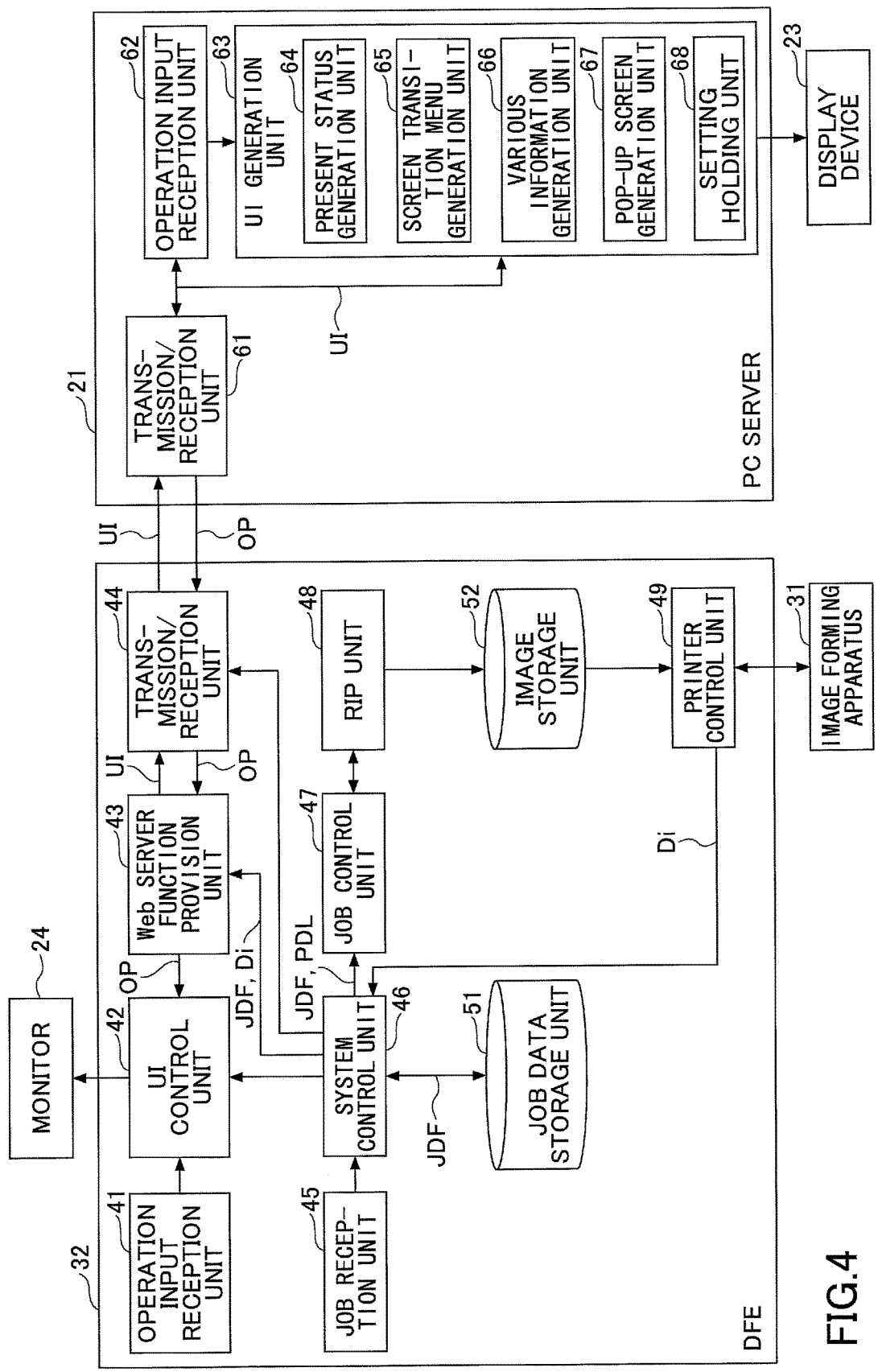
FIG. 4 is a functional block diagram illustrating an example of the DFE and a PC (Personal Computing) server according to the present embodiment.

FIG. 4 is a functional block diagram illustrating an example of the DFE 32 and the PC server 21. The DFE 32 performs, in a work flow, job control, RIP (Raster Image Processor) control and printer control. The DFE 32 operates as a server that provides a main function of printing to the end user environment 1 or the process management unit 20. Meanwhile, the job control is a series of controls for procedures of print jobs, such as receiving a print job, analyzing JDF, generating drawing data and printing by the image forming apparatus 31. The RIP control is a control of preparing drawing commands based on JDF and PDL and causing a RIP engine 59 to generate drawing data. The "RIP" is an abbreviation for "Raster Image Processor", and means a dedicated IC for generating drawing data, or generating drawing data (performing rendering). The printer control is a control of sending drawing data to the image forming apparatus 31 and causing the data to be printed.

The DFE 32 includes an operation input reception unit 41, a UI control unit 42, a Web server function provision unit 43, a transmission/reception unit 44, a job reception unit 45, a system control unit 46, a job control unit 47, a RIP unit 48 and a printer control unit 49. These elements (the operation input reception unit 41, the UI control unit 42, the Web server function provision unit 43, the transmission/reception unit 44, the job reception unit 45, the system control unit 46, the job control unit 47, the RIP unit 48 and the printer control unit 49) are realized by the CPU 321 executing the program 328 and cooperating with various pieces of hardware shown in FIG. 3.

Moreover, the DFE 32 includes a job data storage unit 51 and an image storage unit 52 constructed in the RAM 322 shown in FIG. 3, the auxiliary storage device 323 or the recording medium 331. The job data storage unit 51 and the image storage unit 52 may be disposed on a network.

The job reception unit 45 is realized by the CPU 321 shown in FIG. 3 executing commands of the program 328, the communication device 324 and the like, and receives a print job from the PC server 21 via the network 3. The job reception unit 45 may receive the print job directly from the client PC 22. The job reception unit 45, for example, extracts the JDF and the PDL which are the print jobs from the received data, and outputs to the system control unit 46. For example, as a log, a unique job number, reception date and time, end date and time, present executing process and the like are recorded associated with the print job.

TABLE 1

| Job information | Job name (file name), Number of copies, Number of pages |
|---|---|
| EDIT information | Direction, Printing surface, Rotation, Enlarging/Reducing, Image position, Margin |
| Finishing information | Staple binding, Punching, Folding, Trimming, Output tray |

Table 1 illustrates an example of information included in the JDF. The JDF includes the job information, the EDIT information, the Finishing information and the like. However, the above-described JDF is an example, and may include a wide variety of pieces of information necessary for printing.

The system control unit 46 is realized by the CPU 321 shown in FIG. 3 executing commands of the program 328, and performs job control of the print job, RIP control and printer control. First, the received print job is stored in the job data storage unit 51 or is output to the job control unit 47. For example, in a case where the JDF describes that it is to be stored in the job data storage unit 51 (i.e. the operator 26 executes the print job later), it is stored in the job data storage unit 51. In a case where the job control unit 47 is executing another print job, it is temporarily stored in the job data storage unit 51, and after the other job ends it is output to the job control unit 47.

Moreover, the system control unit 46, which receives an instruction to execute a print job from the operation input reception unit 41 or the PC server 21, outputs the print job stored in the job data storage unit 51 to the job control unit 47. Moreover, the system control unit 46 causes the printer control unit 49 to print the drawing data which the job control unit 47 causes the RIP unit 48 to generate. The operation input reception unit 41 is an example of an operation reception means.

The system control unit 46 manages statuses of respective print jobs (executing, in a queue, standby state, executed state and the like) and records them into the above-described log. The system control unit 46 passes the JDF (including the statuses of the respective print jobs) and device status information Di, which will be described later, to the Web server function provision unit 43.

The job control unit 47 realized by the CPU 321, shown in FIG. 3, executing an instruction of the program 328, acquires a setting regarding printing from the JDF of the print job received from the system control unit 46. Moreover, the job control unit 47 generates a drawing command from the JDF and the PDL and causes the RIP unit 48 to generate drawing data.

The RIP unit 48 is realized by the CPU 321, shown in FIG. 3, executing an instruction of the program 328, executes a drawing command and performs a rasterization, and thereby generates drawing data. The generated drawing data are stored in the image storage unit 52. The image storage unit 52 is a storing means in which the generated drawing data are stored.

The printer control unit 49 is realized by the CPU 321, shown in FIG. 3, executing an instruction of the program 328, and is coupled to the image forming apparatus 31. The printer control unit 49 reads out the drawing data stored in the image storage unit 52 and sends the data to the image forming apparatus 31, and thereby performs printing. The printer control unit 49 sends finishing information acquired from the job control unit 47 to the image forming apparatus 31. The finishing information specifies a stapler, a puncher, information regarding folding, trimming, an output tray, an input tray or the like.

Moreover, the printer control unit 49 communicates with the image forming apparatus 31 to acquire the device status information Di of the image forming apparatus 31. Table 2 illustrates an example of the device status information Di.

TABLE 2

| Configuration of device | Status of device | Counter |
|---|---|---|
| Name of model: *** Software version: 12 Configuration: stapler, puncher | System: normal Remaining amount of toner: 30% Vacancy in waste toner bottle: yes Paper feeding tray 1: A4, large amount . . . Paper feeding tray 8: A3, small amount Paper ejection tray: free area remains | Monochrome: N one sheet Full color: N two sheets Single color: N three sheets Two colors: N four sheets |
| Print condition | Job progress information | |
| Print speed: A [m/s] Fixing temperature: B [° C.] Resolution: C [dpi] Paper tension: D Developing bias voltage: E [V] Charging bias voltage: F [V] Writing time: G [ms] | Number of pages of printed sheets: X Number of finished copies: Y Start time of execution: 2014/12/10/00:00 | |

The device status information D1 is, for example, "a configuration of device, a status of device, a counter, print condition, job progress information" or the like. The device status information D1 shown in Table 2 is only an example, and may include all pieces of information that can be acquired from the image forming apparatus 31 or useful information among the pieces of information. Moreover, the printer control unit 49 determines the communication status based on whether the device status information Di can be acquired from the image forming apparatus 31. The printer control unit 49 passes the device status information Di including the above-described communication status to the system control unit 46.

The operation input reception unit 41 is realized by the CPU 321, shown in FIG. 3, executing an instruction of the program 328 and the input device 325, and receives a variety of operations and inputs by the operator 26.

The UI control unit 42 is realized by the CPU 321, shown in FIG. 3, executing an instruction of the program 328 and the display control unit 326, and displays a UI 5 on the monitor 24. Details will be explained for a UI generation unit 63 of the PC server 21.

The Web server function provision unit 43 is realized by the CPU 321, shown in FIG. 3, executing an instruction of the program 328, and operates as a Web server for the PC server 21 or an arbitrary information processing apparatus. The Web server function provision unit 43 acquires a JDF of each print job and device status information Di from the system control unit 46, and generates UI information that the PC server 21 can interpret. The UI information is, for example, generated by FLASH (trademark registered) which uses HTML (Hyper Text Markup Language), XML (Extensible Markup Language) (or JSON (JavaScript Object Notation)) and Action Script as main languages. That is, the UI information is provided as a Web application or a Web page.

The transmission/reception unit 44 is realized by the CPU 321, shown in FIG. 3, executing an instruction of the program 328 and by the communication device 324 or the like, and sends the UI information (indicated by "UI" in FIG. 4) to the PC server 21. Moreover, the transmission/reception unit 44 receives operation information Op indicating a content of operation of the operator 26 from the PC server 21.

Subsequently, functions of the PC server 21 will be explained. The PC server 21 includes a transmission/reception unit 61, an operation input reception unit 62 and a UI generation unit 63. The above-described units (the transmission/reception unit 61, the operation input reception unit 62 and the UI generation unit 63) are realized by the CPU 321 executing the program 328 and the UI information and cooperating with various hardware shown in FIG. 3.

The transmission/reception unit 61 is realized by the CPU 321, shown in FIG. 3, executing an instruction of the program 328 and by the communication device 324 or the like, and receives UI information from the DFE 32. Moreover, the transmission/reception unit 61 sends operation information Op to the DFE 32. As a communication protocol, for example, HTTP, REST (Representational State Transfer), SOAP (Simple Object Access Protocol) or the like is used, but it is not limited to them.

The operation input reception unit 62 is realized by the CPU 321, shown in FIG. 3, executing an instruction of the program 328 and the UI information and by the input device 325, and receives a variety of operations and input by the operator 26. The information that is input to and received by the operation input reception unit 62 is the operation information Op. The operation input reception unit 62 is an example of an operation reception means.

The UI generation unit 63 is realized by the CPU 321, shown in FIG. 3, executing an instruction of the program 328 and the UI information and by the display control unit 326, and generates and displays an UI 5 to be displayed on the display device 23 coupled to the PC server 21.

The UI generation unit 63 further includes a present status generation unit 64, a screen transition menu generation unit 65, a various information generation unit 66, a pop-up screen generation unit 67 and a setting holding unit 68. The present status generation unit 64 generates a present status to be displayed in the present status display area 11. The present status display area 11 may be referred to as "status bar". The screen transition menu generation unit 65 generates a screen transition menu to be displayed in the screen transition menu display area 12. The various information generation unit 66 generates various pieces of information to be displayed in the various information display area 13. The pop-up screen generation unit 67 analyzes the UI information and generates a pop-up screen 99.

The UI generation unit 63 arranges the present status in the present status display area 11, arranges the screen transition menu in the screen transition menu display area 12 and arranges the various pieces of information in the various information display area 13. The present status display area 11, the screen transition menu display area 12 and the various information display area 13 are arranged inside a program window created by the program 328. Positions of the respective areas inside the program window have been determined in advance. Or, the operator 26 may set the positions of the respective areas. Moreover, the UI generation unit 63 determines the arrangement of the pop-up screen 99 so as not to overlap the present status display area 11.

The setting holding unit 68 stores a setting regarding displaying of the UI 5 which is set by the operator 26. The setting holding unit 68 sets, for example, which of the pop-up screen 99 and the enlarged part of the present status display area 11 is given priority. The enlarged part of the present status display area 11 will be explained with reference to FIG. 16.

<<Example of Method for Realizing the UI Generation Unit>>

Figure 5A:
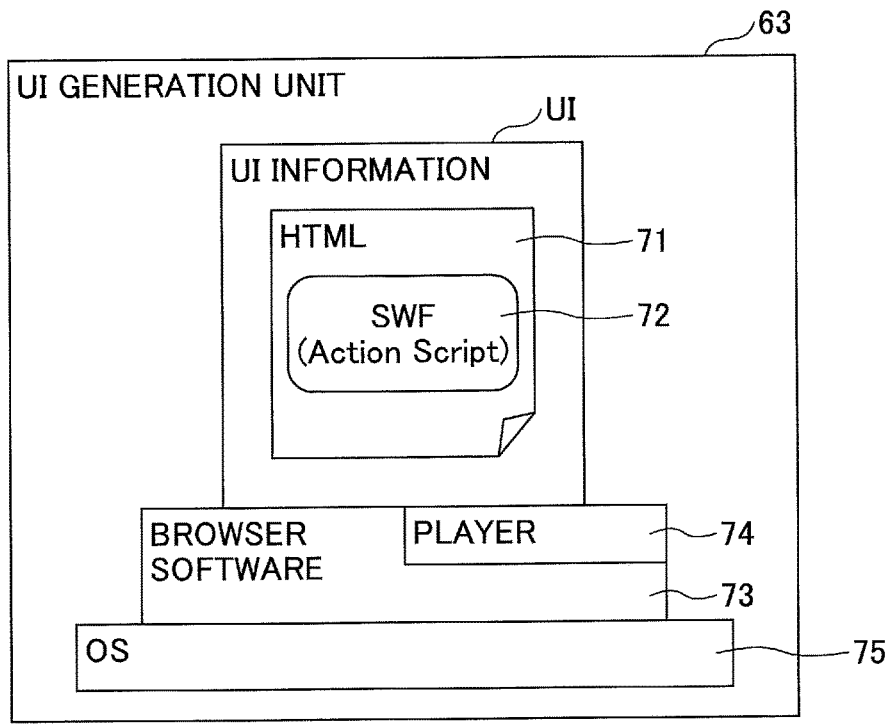
FIGS. 5A and 5B are diagrams for schematically explaining an example of a method for realizing a UI generation unit by the PC server according to the present embodiment.

FIG. 5A is a diagram for schematically explaining an example of a method for realizing the UI generation unit 63 by the PC server 21. In the same way as a general information processing apparatus, the PC server 21 displays a Web page sent from the Web server on the display device 23 by executing browser software on the OS. The Web page includes a description by HTML 71 in at least a part of it. Moreover, a content of a JDF is arbitrarily sent by XML (or JSON) or the like.

However, it is known that it is difficult to customize displaying on the user side by the HTML 71. Therefore, in the present embodiment, the DFE 32, as a Web application described in HTML 71 and SWF (Small Web Format) 72, generates UI information, and thereby it becomes possible to change flexibly the UI 5 on the user side. The SWF 72 is a file of a program generated by FLASH (registered trademark). The SWF 72 is embedded into HTML data via JavaScript (registered trademark).

In order to execute the SWF 72 by the PC server 21, a player 74 for executing the SWF 72 is required to be installed in the browser software 73. The player 74 is one of plug-ins for adding functions to the browser software 73. Therefore, the PC server 21, in which the player 74 is installed in the browser software 73, executes the UI information, thereby it becomes possible to change flexibly the UI 5 on the user side.

Moreover, the PC server 21 executes the SWF 72, and thereby HTTP communication or the like can be performed asynchronously with the DFE 32. That is, the PC server 21 can communicate with the DFE 32 without causing a screen displayed on the display device 23 to transition.

Meanwhile, the method for realizing the UI generation unit 63 using FLASH (trademark registered), as described above, is an example. The PC server 21 may receive the UI information and display the UI 5 by using HTML5, JavaScript, AjaX (processing is progressed by sending/receiving data in an XML (or JSON) format to/from a server without reloading Web pages) and the like.

Figure 5B:
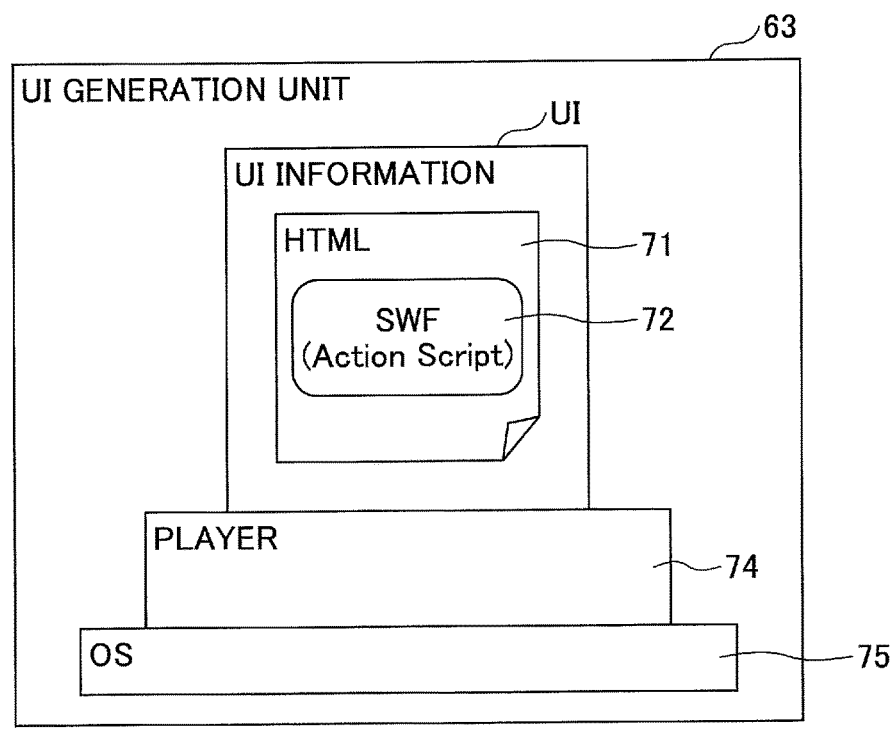

FIG. 5B is a diagram illustrating a variation of the method for realizing the UI generation unit 63. In FIG. 5A, it is explained that the browser software 73 in which the player 74 is installed executes the UI information. However, the PC server 21 can execute the player 74 directly on the OS 75. This is because the player 74 has a function of interpret HTML data or the like. Therefore, the PC server 21 in which the player 74 is installed can interpret the UI information according to the present embodiment and display the UI 5.

<<Regarding the UI Control Unit of DFE>>

The UI control unit 42 of the above-described DFE 32 can be realized in the same way as the UI generation unit 63 of the PC server 21. That is, in the case where the UI control unit 42 is provided with a function of the browser software 73, the player 74 or the like, the UI control unit 42 acquires UI information from the Web server function provision unit 43, and thereby displays UI 5 on the monitor 24.

By configuring the UI control unit 42 as above, it is possible to display the UI 5 on any of the monitor 24 and on the display device 23 by the same mechanism, and thereby cost of development can be reduced.

Meanwhile, the UI control unit 42 may display the UI 5 on the monitor 24 by a different mechanism from that of the PC server 21 displaying the UI 5 on the display device 23. The mechanism without using browser software includes, for example, a method for analyzing by the UI control unit 42 UI information described in Visual BASIC (Trademark registered), Visual C# (Trademark registered), Java (Trademark registered) or the like, and displaying.

<Example of the UI>

The UI 5 according to the present embodiment can present a wide variety of pieces of information. Moreover, an operator can customize the UI 5. Therefore, the UI 5 described as follows will be explained only as an example.

Figure 6:
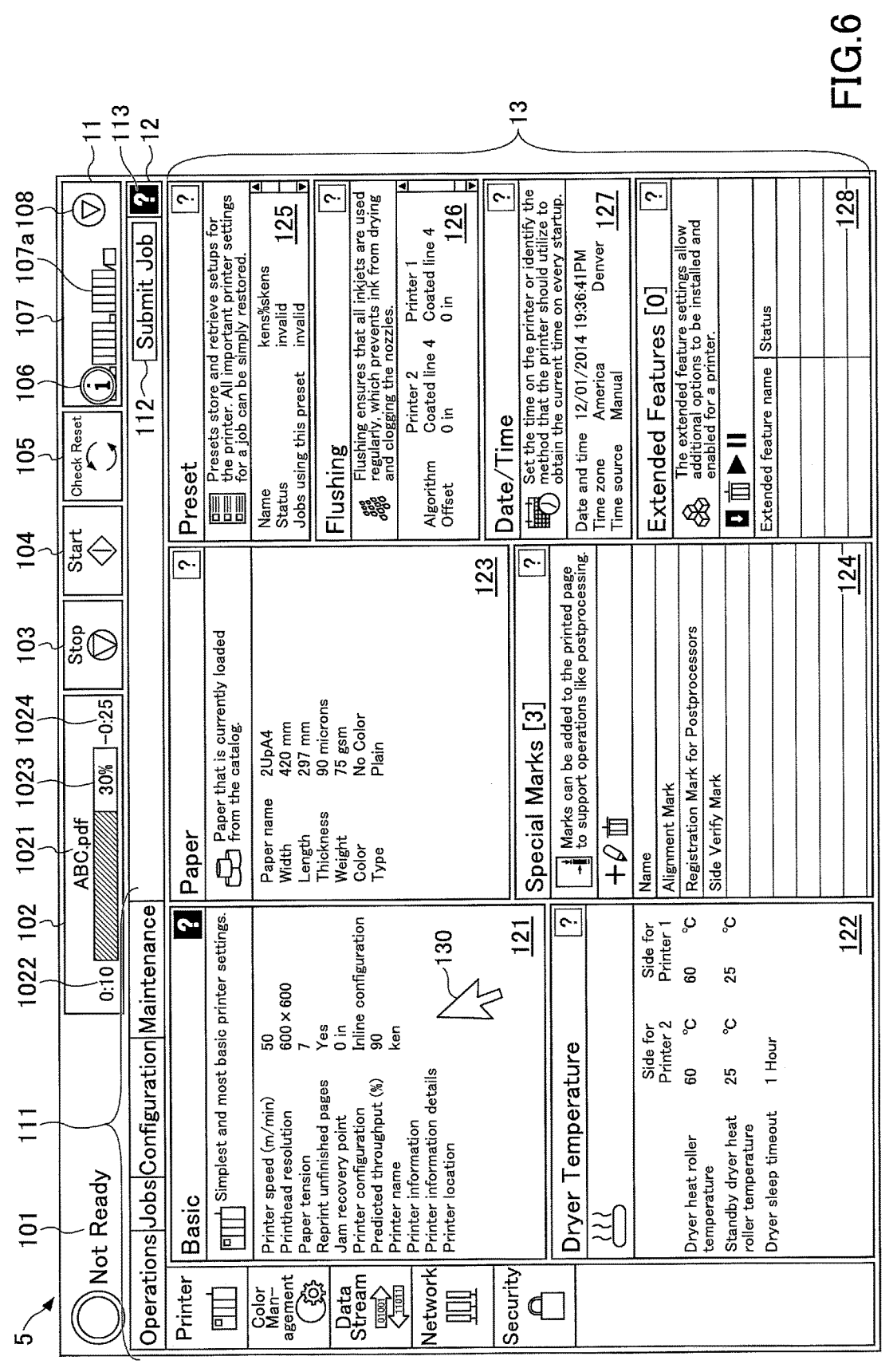

FIG. 6 is a diagram illustrating an example of the UI 5. The UI 5 includes, as described above, the present status display area 11 (an example of a first region or a second display element), the screen transition menu display area 12 (an example of a second region) and the various information display area 13 (an example of the second region or a first display element). The Web server function provision unit 43 generates UI information for displaying the UI 5 including the above-described areas using JDF and device status information Di.

<<Present Status Display Area 11>>

The present status display area 11 includes a status display part 101, a job information display part 102, a job reception stop button 103, a job reception start button 104, an error reset button 105, an information display part 106, a device icon unit 107 and an open/close button 108.

The status display part 101 displays a communication status with the image forming apparatus 31. The communication status with the image forming apparatus 31 includes "READY" indicating that the DFE can communicate, "Not Ready" indicating that communication is impossible, or the like. The Web server function provision unit 43 determines the communication status with the image forming apparatus 31 based on a communication status included in the device status information Di.

The job information display part 102 displays a job name 1021 of a currently-executing print job (it may be a filename of an object to be printed), a progress status 1023, an elapsed time for a process 1022, and a remaining time for a process 1024. The above-described pieces of information are obtained by modifying the JDF and the device status information Di and displaying. An example of the modification will be explained. The Web server function provision unit 43 acquires a total number of pages and a number of copies of the currently-executing print job from the JDF output by the system control unit 46, and a number of printed sheets that the printer control unit 49 obtains from the image forming apparatus 31. The progress status 1023 can be calculated by dividing (number of printed sheets) by a product of (total number of pages to be printed) and (number of copies), i.e. "(number of printed sheets)/((total number of pages)×(number of copies))". Moreover, the Web server function provision unit 43 obtains the elapsed time for the process 1022 by subtracting from the current time the execution start time for the print job acquired from the system control unit 46. Moreover, the Web server function provision unit 43 calculates a print time per one page (print speed) until the current time from the number of pages of printed sheets and the elapsed time for process. The Web server function provision unit 43 obtains the remaining time for the process 1024 by dividing a number of pages of remaining sheets by the print speed. Meanwhile, the above-described modification may be performed by the present status generation unit 64 of the PC server 21.

The job reception stop button 103 is a button for stopping receiving print jobs by the operator 26 for the DFE 32. In a case where the image forming apparatus 31 stops, for example, the operator 26 holds the job reception stop button down so that the DFE 32 does not further receive print jobs as an emergency treatment. In a case of detecting by the operation information Op or the operation input reception unit 41 of the DFE 32 that the job reception stop button 103 is held down, the system control unit 46 prevents the job reception unit 45 from receiving print jobs. Then, a new print job becomes unable to be received.

The job reception start button 104 is a button for restarting receiving print jobs which have been stopped by the job reception stop button 103. For example, in a case where the image forming apparatus 31 starts operations, the operator 26 holds the job reception start button 104 down. In a case of detecting by the operation information Op or the operation input reception unit 41 of the DFE 32 that the job reception start button 104 is held down, the system control unit 46 restarts receiving print jobs by the job reception unit 45. Then, a new print job becomes able to be received.

The error reset button 105 is used in a case where some error occurs in the image forming apparatus 31. In such a case, the error is reported to the DFE 32. Even if the operator 26 corrects the error in the image forming apparatus 31, it may not be reported to the DFE 32 that the error is corrected, and the record that the error is detected may remain in the DFE 32. In this case, the DFE may keep a print job stopped, and productivity is reduced. Therefore, the operator 26, after correcting the error in the image forming apparatus 31, holds the error reset button 105 down in order to erase surely the record of the error from the DFE 32.

The information display part 106 displays an information icon for calling the operator's attention in a case where there is information that needs to inform the operator 26. As an example, a case where there is information that needs to inform the operator 26 regarding the print condition will be explained. The system control unit 46 keeps a preferred print condition as shown in Table 3.

TABLE 3

| Type of paper | Print speed | Fixing temperature | Resolution | Paper tension | Developing bias voltage | Charging bias voltage | Writing time |
|---|---|---|---|---|---|---|---|
| Regular paper | $A_1$ | $B_1$ | $C_1$ | $D_1$ | $E_1$ | $F_1$ | $G_1$ |
| Coated paper | $A_2$ | $B_2$ | $C_2$ | $D_2$ | $E_2$ | $F_2$ | $G_2$ |
| Thick paper | $A_3$ | $B_3$ | $C_3$ | $D_3$ | $E_3$ | $F_3$ | $G_3$ |

The system control unit 46 determines whether the present print condition described in the JDF coincides with the preferred print condition. In a case where they are different from each other, the system control unit 46 reports to the Web server function provision unit 43 that the print conditions are different from each other along with the preferred print condition and the present print condition. The above-described information is included, for example, in the device status information Di. The Web server function provision unit 43 generates an information icon such as "i" to be displayed on the information display part 106. Meanwhile, the present status generation unit 64 of the PC server 21 may generate an information icon.

Since the present print condition is described in the JDF and can be changed by the operator 26, the present print condition is not necessarily erroneous. Then, by displaying that the present print condition is different from the preferred print condition, the operator 26 can handle the print condition arbitrarily without feeling confused.

The device icon unit 107 displays a device icon 107a which mimics an appearance of the image forming apparatus 31. In a case where an error occurs in the image forming apparatus 31, an error occurrence location in the device icon 107a is indicated by red color, for example. The Web server function provision unit 43 analyzes the device status information Di and identifies an error occurrence location in the image forming apparatus 31. Then, the error occurrence location in the device icon 107a is changed to red or the like. Meanwhile, the present status generation unit 64 of the PC server 21 may generate a device icon 107a.

The open/close button 108 is a button for enlarging the present status display area 11 by the operator 26, and for returning to a normal state, as shown in FIGS. 5A and 5B, after enlarging the display. The enlarged present status display area 11 will be explained with reference to FIGS. 16A to 16C. Meanwhile, modes of the open/close button 108 are preferably different from each other between the normal state and a state of the enlarged display.

UI information of the present status display area 11 generated by the Web server function provision unit 43 is sent to the PC server 21 or the UI control unit 42. The transmission/reception unit 61 of the PC server 21 or the UI control unit 42 cyclically acquires the UI information, and the present status generation unit 64 updates the UI 5 in real-time. A length of cycle only has to be an extent that real-time is guaranteed (e.g. from less than 1 second to 1 minute or so). Moreover, the length need not to be fixed.

Since the present status display area 11 is displayed constantly, the operator 26 can determine constantly whether to communicate with the image forming apparatus 31 (the status display part 101), a progress status of a print job (the job information display part 102), presence or absence of a matter requiring notice (the information display part 106) and presence or absence of an error (the device icon unit 107). Moreover, the operator 26 can prevent the DFE 32 from receiving print jobs at any time if necessary (the job reception stop button 103), and can restart it (the job reception start button 104). Moreover, an error can be reset (the error reset button 105). Moreover, it is possible to confirm that an error occurs and a location of error (the device icon 107a).

Therefore, the operator 26 can perceive constantly the status of the image forming apparatus 31, and a time period in which the image forming apparatus 31 stops can be minimized.

<<Screen Transition Menu Display Area 12>>

The screen transition menu display area 12 includes a screen transition button 111, a print condition setting button 112 and a help button 113.

The screen transition button 111 is a button for switching by the operator 26 among various pieces of information displayed in the various information display area 13. The various pieces of information are associated with one or more of each of buttons, "operation", "jobs", "configuration" and "maintenance", as shown in figures. In a case where the operator 26 holds down the screen transition button 111, the various pieces of information associated with the screen transition button 111 are displayed on the various information display area 13. Therefore, even in a case of many types of information being displayed on the display device 23 or the monitor 24, the operator 26 can display promptly target information.

Meanwhile, by holding down the button "operation", various pieces of fundamental information for executing a print job (calendar/time, remaining amounts of toners (inks) of respective colors, a preview of a currently-executing print job, a preview of a scheduled print job, a history of print jobs or the like) are displayed. By holding down the button "jobs", detailed information such as the currently-executing print job, the scheduled print job and previous print jobs is displayed. By holding down the button "configuration", the print condition is displayed. By holding down the button "maintenance", information on the image forming apparatus 31 (model name, device configuration, software version, detailed status of remaining amounts or the like of the paper feeding tray, the paper ejection tray and toner (ink)) is displayed.

The print condition setting button 112 is a button for setting the print condition edited by the operator 26 for the image forming apparatus 31.

The help button 113 is a button for displaying help information for the UI 5.

The various information display area 13 in the case where the button "configuration", for example, among the screen transition button 111 is held down will be explained. Some partitions are displayed in the various information display area 13. Since positions and types of these partitions can be customized by the operator 26, the various information display area 13, shown in figures, is only an example.

In the various information display area 13 shown in FIG. 6, partitions 121-128 of various information, i.e. "basic", "dryer temperature", "paper", "special marks", "preset", "flushing", "date/time", "extended features" are displayed. These pieces of information are included in the UI information that the Web server function provision unit 43 generates from the device status information Di.

The partition 121 of "basic" displays fundamental items, which will be described later, of the print condition of the image forming apparatus 31. The partition 122 of "dryer temperature" displays a temperature of a roller for drying a paper. The partition 123 of "paper" displays information such as a size or a thickness of the paper. The partition 124 of "special marks" displays a position for adding a mark (for supporting an operation of post processes) to the printed paper. The partition 125 of "preset" displays a list of settings stored so as to perform setting of the image forming apparatus 31 collectively. The partition 126 of "flushing" displays information upon performing flushing (forced discharging) of an ink jet nozzle. The partition 127 of "date/time" displays a time zone, an acquisition destination or the like regarding time managed by the image forming apparatus 31. The partition 128 of "extended features" displays an extension function that can be installed in the image forming apparatus 31.

The operator 26 can make a selection for each of the partitions by clicking with a mouse cursor 130 or by touching with a finger.

According to the above-described configuration, the operation input reception unit 41 of the DFE 32 or the operation input reception unit 62 of the PC server 21 receives an instruction for displaying a pop-up screen 99 of the selected partition. Then, the UI generation unit 63 or the UI control unit 42 displays the pop-up screen 99 (an example of a relation display element or a third display element) generated by the pop-up screen generation unit 67 overlapping at least the various information display area 13. One of the features of the present invention is that the pop-up screen 99 does not overlap the present status display area 11 upon displaying.

<<Pop-Up Screen 99>>

Next, the pop-up screen 99 will be explained with reference to FIG. 7. The pop-up screen generation unit 67 of the PC server 21 interprets the UI information, which is generated by the Web server function provision unit 43 from the device status information Di as a Web application or a Web page, and generates the pop-up screen 99.

Figure 7:
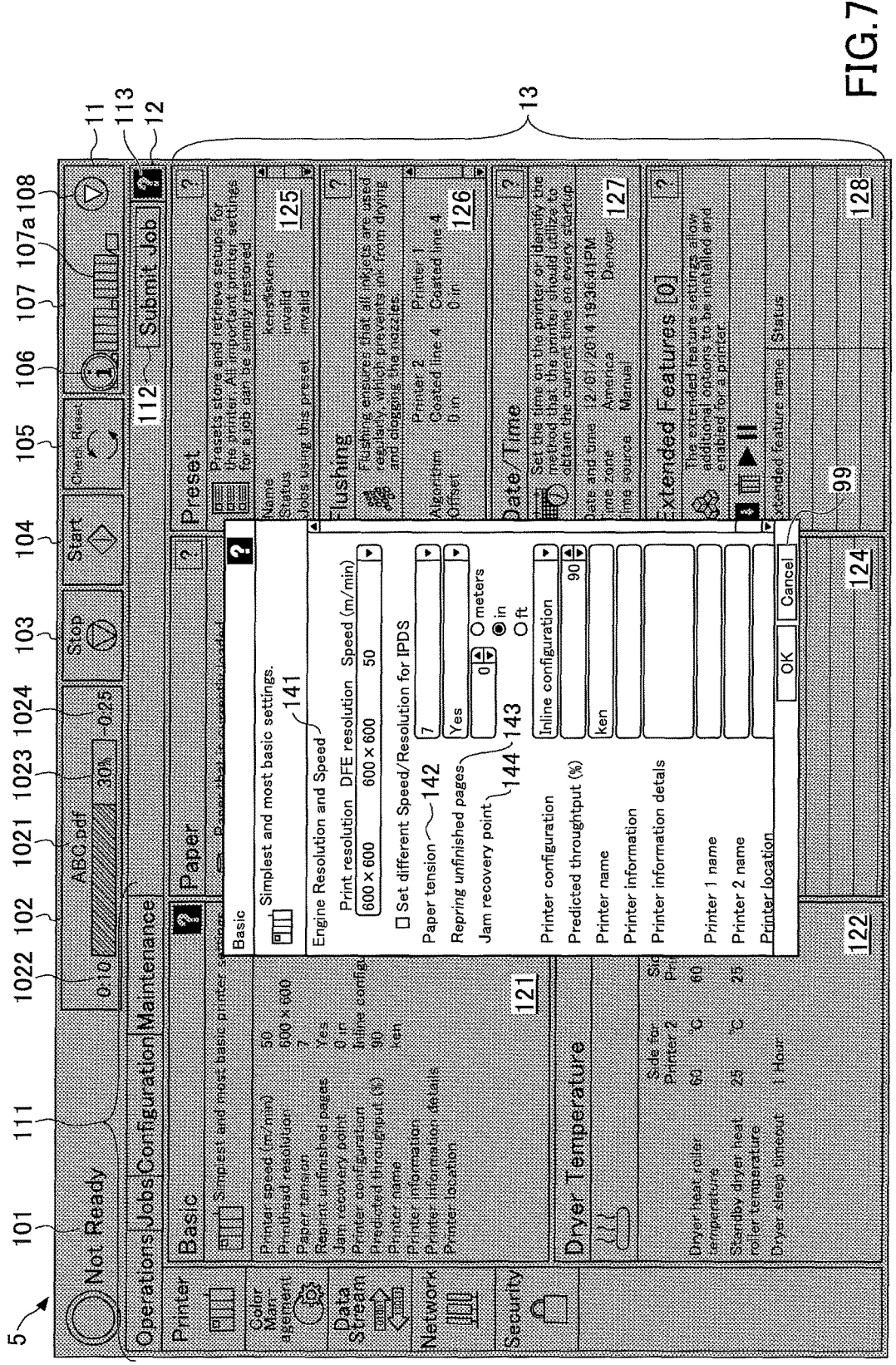
FIG. 7 is a diagram illustrating an example of the UI on which a pop-up screen is displayed according to the present embodiment.

FIG. 7 is a diagram illustrating an example of the UI 5 on which the pop-up screen 99 is displayed. FIG. 7 illustrates the pop-up screen 99 in the case of selecting the partition 121 of "basic". Also in the case of selecting other partitions, the pop-up screen 99 is displayed. The illustrated UI 5 is only an example.

The pop-up screen 99 displays RIP information (resolution of the image forming apparatus, RIP resolution and rendering speed) 141, a paper tension 142, reprinting setting for a print incomplete page 143, a restoration position for a paper jam 144 or the like. Moreover, the operator 26 can edit the displayed information by using an input device 325 (a keyboard or a mouse) or the finger.

Therefore, the operator 26 can edit various pieces of information included in any of the partitions of the various information display area 13 by using the pop-up screen 99. However, since the pop-up screen 99 does not overlap the present status display area 11, a situation that it becomes difficult for the operator 26 to perceive the present status of the image forming apparatus 31 is prevented. Meanwhile, the pop-up screen 99 may not have a function of editing, i.e. the pop-up screen may be a screen for only displaying information.

<Procedure of Displaying Pop-Up Screen 99>

Figure 8:
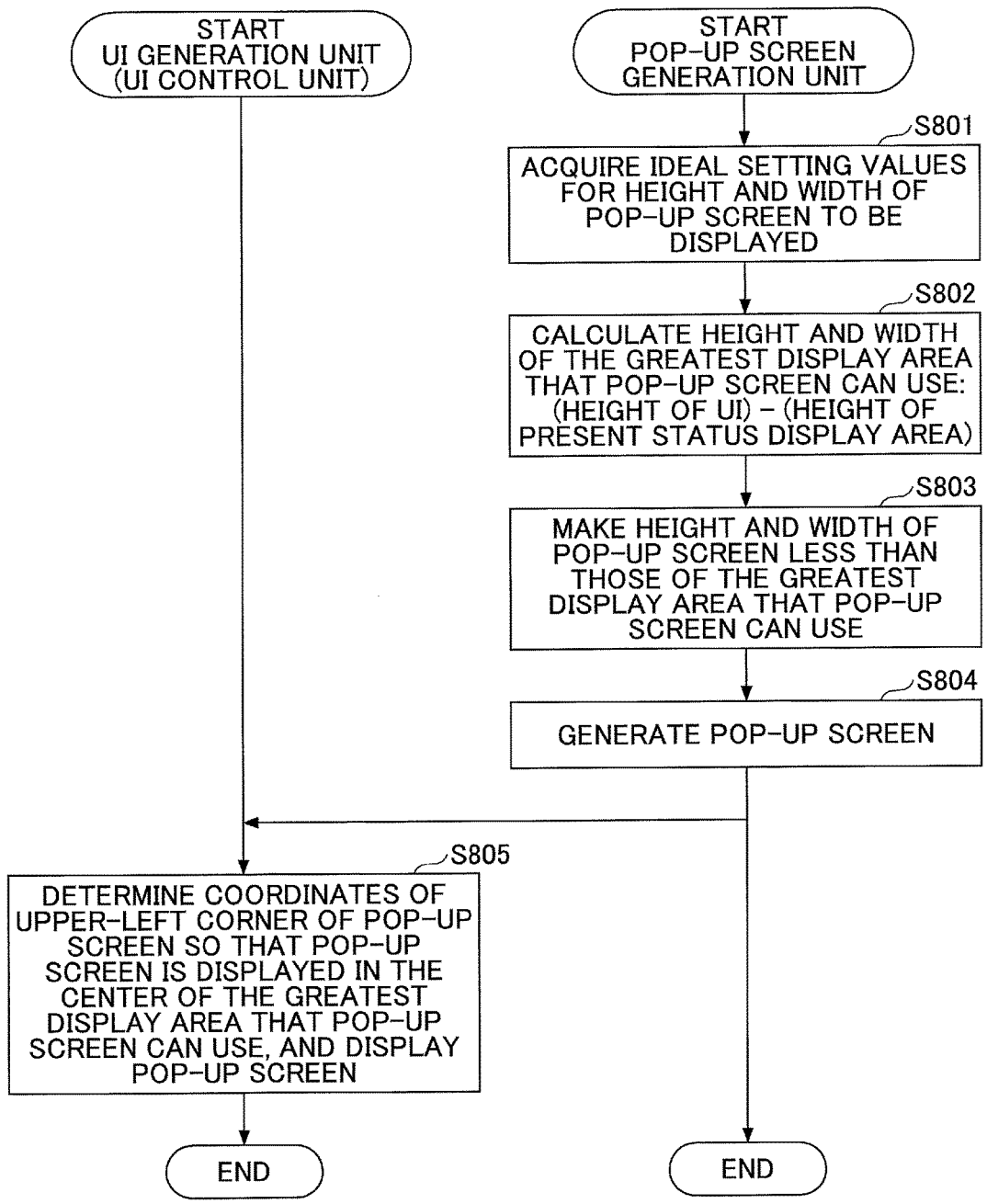
FIG. 8 is a flowchart illustrating an example of a procedure of a UI control unit for displaying the pop-up screen according to the present embodiment.
Figure 9B:
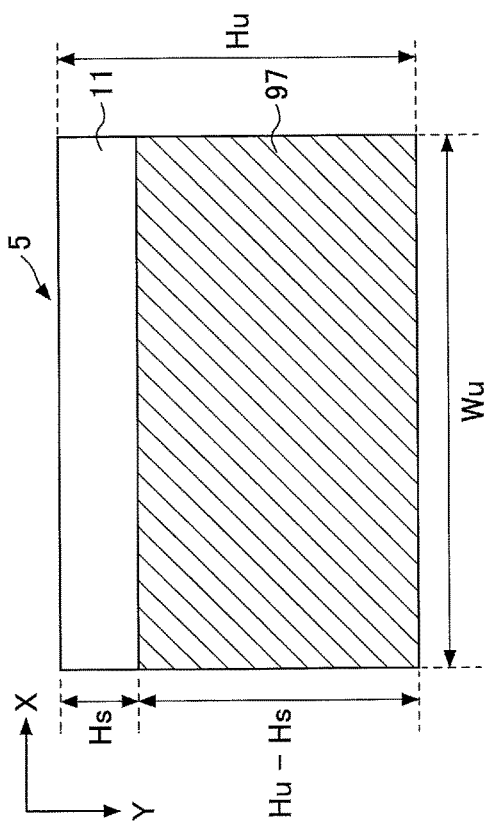
FIGS. 9A to 9D are diagrams for schematically explaining an example of a layout of the pop-up screen according to the present embodiment.

Next, a procedure of displaying the pop-up screen 99 will be explained with reference to FIGS. 8 to 10. FIG. 8 is a flowchart illustrating an example of the procedure of the UI control unit 42 for displaying the pop-up screen 99. FIGS. 9A to 10 are diagrams for schematically explaining an example of a layout of the pop-up screen 99. Meanwhile, for convenience of explanation, in FIGS. 9A to 10, the screen transition menu display area 12 and the various information display area 13 are not distinguished from each other.

First, the operator 26 selects a partition (step S801). The pop-up screen generation unit 67 acquires ideal setting values for a height and a width of the pop-up screen 99 to be displayed. The ideal setting values, with which all pieces of information included in the partition can be displayed in just proportions, have been determined for each of the partitions in advance. FIG. 9A shows ideal setting values for the pop-up screen 99. In FIG. 9A, the ideal setting values for the pop-up screen 99 are indicated by a height Hp and a width Wp.

Next, the pop-up screen generation unit 67 calculates the values of the height and the width of the greatest display area that the pop-up screen 99 can use (in the following, referred to as "displayable area 97") (step S802). The displayable area 97 is a part of the UI 5 without the present status display area 11. As shown in FIG. 9B, sizes of the UI 5 are expressed by a height Hu and a width Wu, and a height of the present status display area 11 is denoted by Hs. Then, the height and the width of the displayable area 97 are obtained by the following formulas:

Height of displayable area 97=$Hu-Hs$, and

Width of displayable area 97=$Wu$.

Next, the pop-up screen generation unit 67 makes the height and the width of the pop-up screen 99 less than those of the displayable area 97 (step S803). That is, the following processes are performed:

in a case where Hp is less than or equal to a difference between Hu and Hs (Hp<=Hu−Hs), the pop-up screen generation unit 67 sets the height of the pop-up screen 99 to the ideal setting value of height Hp;

in a case where Hp is greater than the difference between Hu and Hs (Hp>Hu−Hs), the pop-up screen generation unit 67 sets the height of the pop-up screen 99 to the difference between Hu and Hs (Hu−Hs);

in a case where Wp is less than or equal to Wu (Wp<=Wu), the pop-up screen generation unit 67 sets the width of the pop-up screen 99 to the ideal setting value of width Wp; and in a case where Wp is greater than Wu (Wp>Wu), the pop-up screen generation unit 67 sets the width of the pop-up screen 99 to Wu.

The pop-up screen generation unit 67 generates the pop-up screen with the height and the width which are set in Step S803 (step S804). FIG. 9C shows an example of the height and the width of the generated pop-up screen 99. In the example shown in FIGS. 9A and 9B, since Hp is greater than the difference between Hu and Hs (Hp>Hu–Hs), the height of the pop-up screen 99 shown in FIG. 9C is set to Hu–Hs. Moreover, since the height is less than the ideal setting value, a scroll bar 98 is arranged. Meanwhile, since the Wp is less than or equal to Wu (Wp<=Wu), the width of the pop-up screen 99 is the ideal setting value (width Wp).

Next, the UI generation unit 63 or the UI control unit 42 displays the pop-up screen 99 (step S805). The display position is a center of the displayable area 97. Therefore, the UI generation unit 63 or the UI control unit 42 determines coordinates of an upper left corner of the pop-up screen 99 so that the pop-up screen 99 is displayed at the center of the displayable area 97.

Figure 9D:
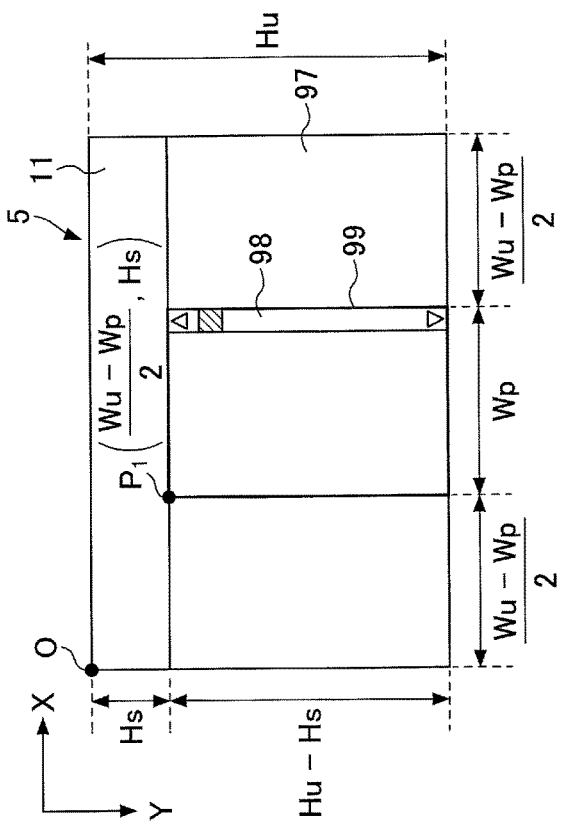
Figure 9A:
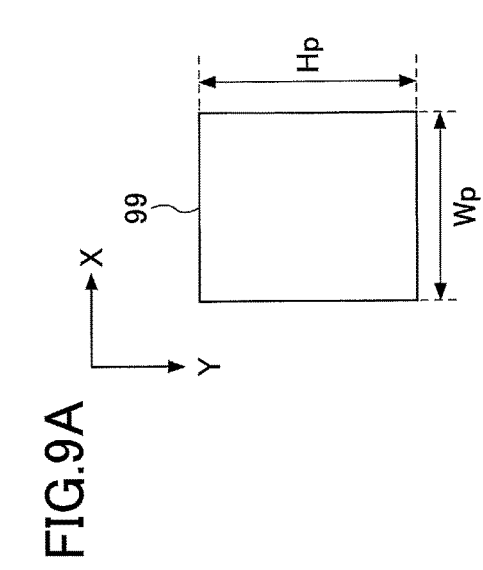
Figure 9C:
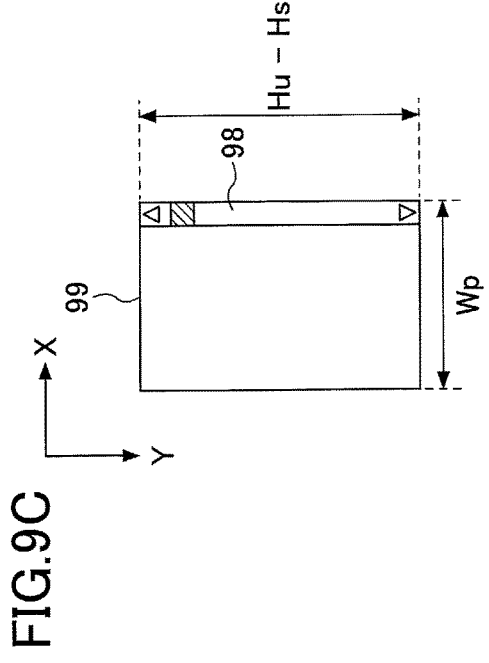
Figure 10:
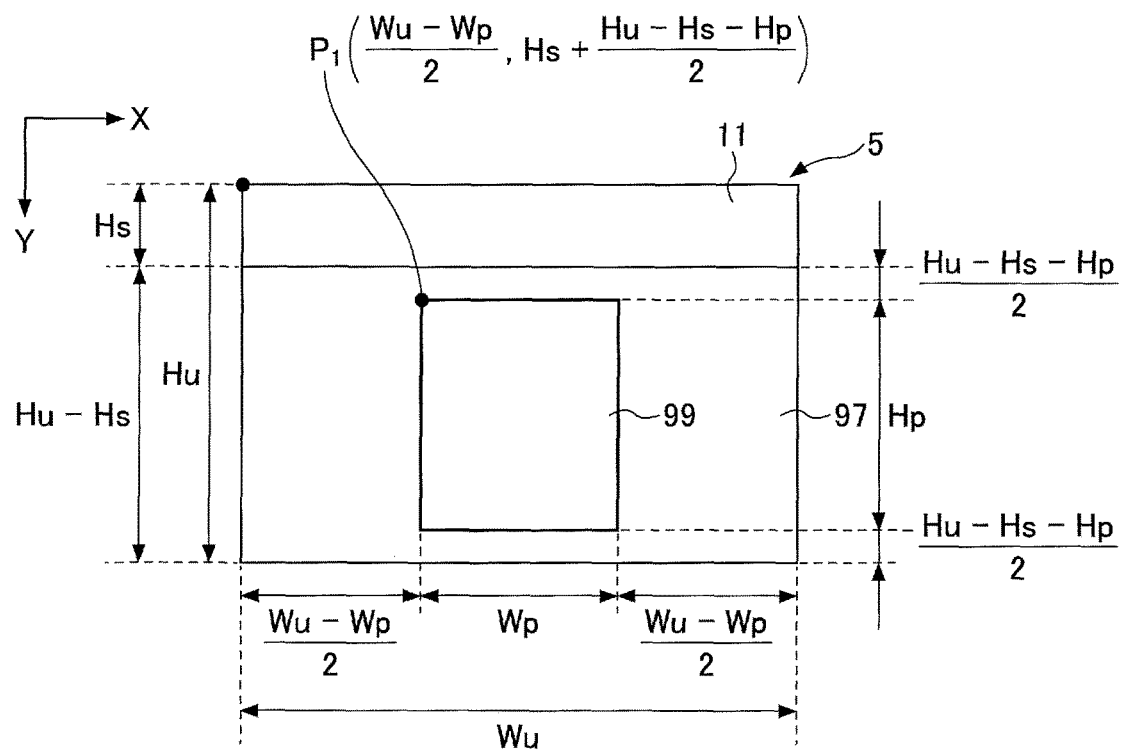
FIG. 10 is a diagram for schematically explaining another example of the layout of the pop-up screen according to the present embodiment.

FIG. 9D is a diagram for explaining an example of a method for calculating the coordinates of the upper left corner P1 of the pop-up screen 99. For convenience of explanation, for example, a point "O" at an upper left corner of the UI 5 is assumed to be the origin, and the horizontal direction and the vertical (downward) direction are assumed to be an X-axis direction and a Y-axis direction, respectively. As shown in the drawings, the X-coordinate of the upper left corner P1 of the pop-up screen 99 is (Wu–Wp)/2 and the Y-coordinate is Hs.

FIG. 10 is a diagram illustrating another example of the layout of the pop-up screen 99. In FIG. 10, Hp is less than or equal to the difference between Hu and Hs (Hp<=Hu–Hs) and Wp is less than or equal to Wu (Wp<=Wu). Therefore, the X-coordinate of the upper left corner P1 of the pop-up screen 99 is (Wu–Wp)/2 and the Y-coordinate is {Hs+(Hu–Hs–Hp)/2}.

As described above, soon after the pop-up screen 99 is displayed, the pop-up screen 99 is displayed away from the present status display area 11. Moreover, since the pop-up screen 99 is displayed at the center of the displayable area 97, it is easy for the operator to edit the pop-up screen 99.

<<Movement after Displaying the Pop-Up Screen 99>>

Next, processes by the UI generation unit 63 or the UI control unit 42 in a case where the operator 26 moves the pop-up screen 99 will be explained with reference to FIGS. 11 to 13B. FIG. 11 is a flowchart illustrating an example of a procedure of the UI generation unit 62 or the UI control unit 42 for displaying the moved pop-up screen 99. FIGS. 12A to 13B are diagrams for schematically explaining an example of displaying of the moved pop-up screen 99.

Figure 12A:
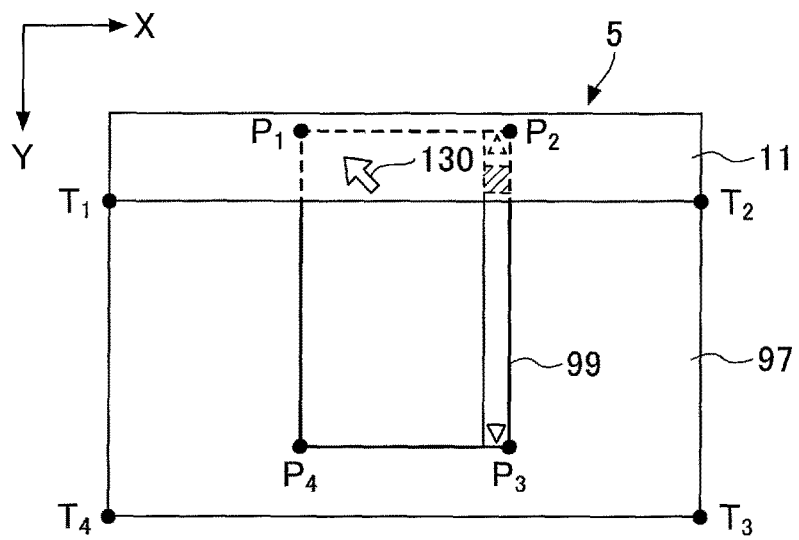
FIGS. 12A and 12B are diagrams for schematically explaining an example of displaying of the moved pop-up screen according to the present embodiment.
Figure 12B:
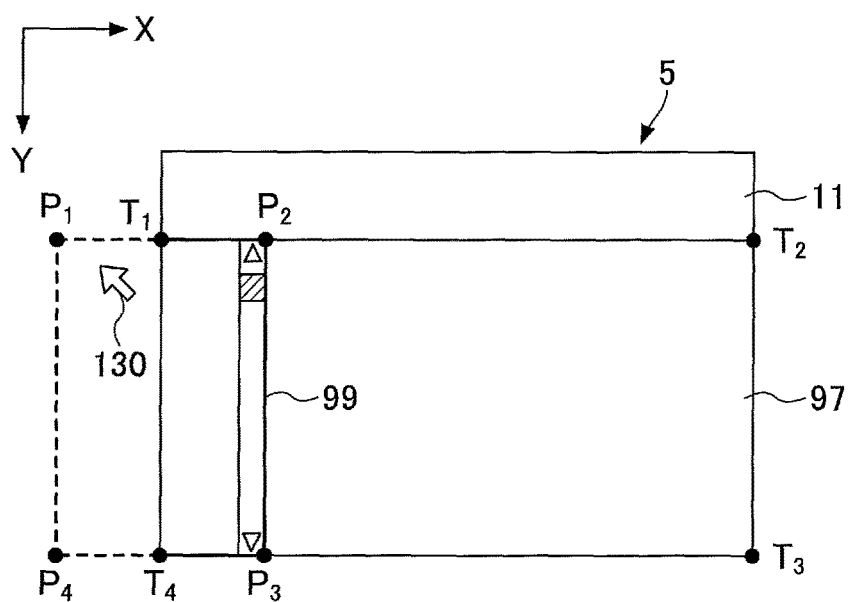

The process illustrated in FIG. 11 starts by the operator 26 dragging the pop-up screen 99 to an arbitrary position in the UI 5. That is, it is a state where the operator 26 holds the pop-up screen 99 by a mouse cursor or the finger and moves it to an arbitrary position, and the mouse cursor or the finger is in contact with the pop-up screen 99. As shown in FIGS. 12A and 12B, while the operator 26 holds the pop-up screen 99, the pop-up screen 99 is allowed to be moved to any position in the UI 5 including the present status display area 11. But, as shown in dotted lines in FIG. 12A, the present status display area 11 does not hide behind the pop-up screen 99. However, while the operator 26 moves the pop-up screen 99, the present status display area 11 may hide behind the pop-up screen 99.

First, the UI generation unit 63 of the UI control unit 42 determines whether a mouse-up event occurs (step S1101). That is, it is determined whether the operation input reception unit 41 or 62 detects a mouse-up event. The "mouse-up" means releasing by the operator 26 the pop-up screen 99 which has been held. By the mouse-up, a final display position of the pop-up screen 99 is selected and input.

In a case where the mouse-up event occurs, the UI generation unit 63 or the UI control unit 42 determines whether the pop-up screen 99 enters the displayable area 97 (step S1102). In this determination, coordinates of respective corners P1 to P4 of the pop-up screen are compared with coordinates of corners T1 to T4 of the displayable area 97. For example, in a case where the Y-coordinate of P1 or P2 is less than the Y-coordinate of T1 or T2, it is determined that the pop-up screen 99 does not enter the displayable area 97. In a case where the X-coordinate of P2 or P3 is greater than the X-coordinate of T2 or T3, it is determined that the pop-up screen 99 does not enter the displayable area 97. In a case where the Y-coordinate of P3 or P4 is greater than the Y-coordinate of T3 or T4, it is determined that the pop-up screen 99 does not enter the displayable area 97. In a case where the X-coordinate of P1 or P4 is less than zero (the X-coordinate of T1 or T4), it is determined that the pop-up screen 99 does not enter the displayable area 97.

In the case where the pop-up screen 99 does not enter the displayable area 97, the processes in and after step S1103 are executed.

The UI generation unit 63 or the UI control unit 42 sets the X-coordinate of the upper left corner P1 of the pop-up screen 99 to a greater one of (i) and (ii) as follows (step S1103):

(i) an X-coordinate of the pop-up screen 99 upon performing the mouse-up; and (ii) an X-coordinate of the left end of the displayable area 97.

The process will be explained with reference to FIG. 12B. In FIG. 12B, the pop-up screen 99 is moved beyond the left end of the displayable area 97. In this case, the X-coordinate of the left end of the displayable area 97 is greater than the X-coordinate of the upper-left corner P1 of the pop-up screen 99 upon performing the mouse-up. Therefore, in the state of FIG. 12B, the X-coordinate of the pop-up screen 99 is set to the X-coordinate of the left end (the corner T1 or T4) of the displayable area 97. That is, the position of the pop-up screen 99 is modified to the position inside the displayable area 97 which is the nearest to the position where the mouse-up is performed. According to the above-described processes, the position of the pop-up screen 99 can be modified to a position where visual axis movement of the operator 26 is small.

On the other hand, a case where the pop-up screen 99 does not go over the left end of the displayable area 97, as shown in FIG. 12A, will be explained. In this case, the X-coordinate of the upper-left corner P1 of the pop-up screen 99 upon performing the mouse-up is greater than the X-coordinate of the left end of the displayable area 97. Therefore, the "modified" X-coordinate of the upper-left corner P1 of the pop-up screen 99 is the same as the X-coordinate of the upper-left corner P1 of the pop-up screen 99 upon performing the mouse-up.

Meanwhile, the position of the pop-up screen 99 may be the center of the displayable area 97, as shown in FIG. 9D or 10, not the position inside the displayable area 97 which is the nearest to the position where the mouse-up is performed. In this case, the operator 26 can modify the position of the pop-up screen 99 to the center by moving the pop-up screen 99 to the outside of the displayable area 97.

Next, the UI generation unit 63 or the UI control unit 42 sets the Y-coordinate of the upper-left corner P1 of the pop-up screen 99 to a greater one of (iii) and (iv) as follows (step S1104):

(iii) a Y-coordinate of the pop-up screen 99 upon performing the mouse-up; and (iv) a Y-coordinate of the upper end of the displayable area 97.

In this example, the pop-up screen 99 is assumed to be moved beyond the upper end of the displayable area 97, as shown in FIG. 12A. In this case, the Y-coordinate of the upper end of the displayable area 97 is greater than the Y-coordinate of the upper-left corner P1 of the pop-up screen 99 upon performing the mouse-up. Therefore, in this case, the Y-coordinate of the upper-left corner P1 of the pop-up screen 99 is set to the Y-coordinate of the upper end (the corner T1 or T2) of the displayable area 97.

On the other hand, in a case where the pop-up screen 99 does not go over the upper end of the displayable area 97, as shown in FIG. 12B, the Y-coordinate of the upper-left corner P1 of the pop-up screen 99 upon performing the mouse-up is greater than the Y-coordinate of the upper end of the displayable area 97 (In this example, both Y-coordinates are equal). Therefore, the "modified" Y-coordinate of the upper-left corner P1 of the pop-up screen 99 is the same as the Y-coordinate of the upper-left corner P1 of the pop-up screen 99 upon performing the mouse-up.

Next, the UI generation unit 63 or the UI control unit 42 sets the X-coordinate of the upper left corner P1 of the pop-up screen 99 to a smaller one of (v) and (vi) as follows (step S1105):

(v) an X-coordinate of the pop-up screen 99 upon performing the mouse-up; and (vi) a coordinate obtained by subtracting the width of the pop-up screen 99 from the X-coordinate of the right end of the displayable area 97.

Figure 13A:
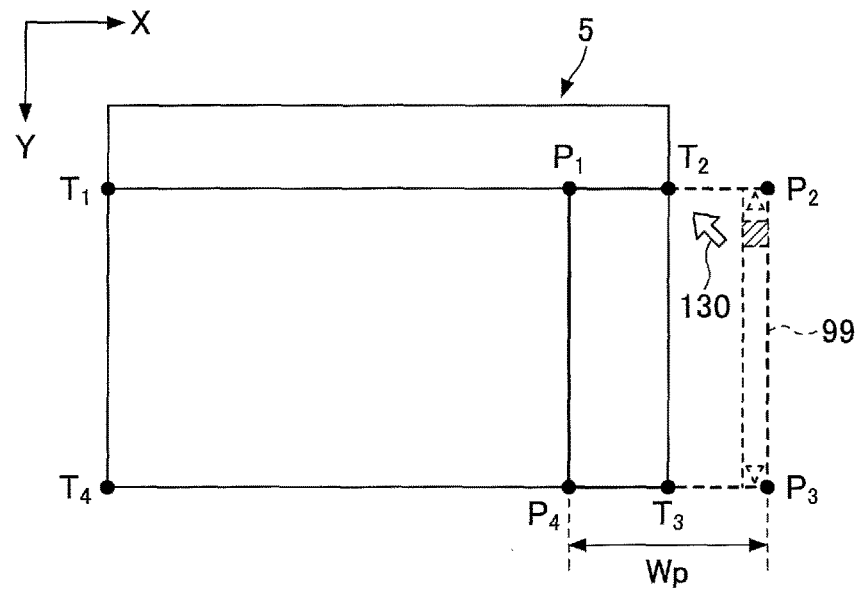
FIGS. 13A and 13B are diagrams for schematically explaining another example of the displaying of the moved pop-up screen according to the present embodiment.

The process will be explained with reference to FIG. 13A. In FIG. 13A, the pop-up screen 99 is moved beyond the right end of the displayable area 97. In this case, in order for the pop-up screen 99 to enter the displayable area 97, the X-coordinate of the upper-left corner P1 is required to be on the left side of the displayable area 97 by the width of the pop-up screen 99. In the example of FIG. 13A, the coordinate obtained by subtracting the width of the pop-up screen 99 from the X-coordinate of the right end of the displayable area 97 is smaller than the X-coordinate of the upper-left corner P1 of the pop-up screen 99 upon performing the mouse-up. Therefore, the UI generation unit 63 or the UI control unit 42 sets the X-coordinate of the upper-left corner P1 of the pop-up screen 99 to the coordinate obtained by subtracting the width of the pop-up screen 99 from the X-coordinate of the right end of the displayable area 97.

Meanwhile, in a case where the pop-up screen 99 does not go over the right end of the displayable area 97, the process is as follows. The X-coordinate of the upper-left corner P1 of the pop-up screen 99 upon performing the mouse-up is smaller than the coordinate obtained by subtracting the width of the pop-up screen 99 from the X-coordinate of the right end of the displayable area 97. Therefore, the X-coordinate of the upper-left corner P1 of the pop-up screen 99 upon performing the mouse-up is employed.

Meanwhile, in relation to Step S1103, a smaller one of the X-coordinates of the upper-left corner P1 set in Step S1103 and in Step S1105 is employed.

The UI generation unit 63 or the UI control unit 42 sets the Y-coordinate of the upper left corner P1 of the pop-up screen 99 to a smaller one of (vii) and (viii) as follows (step S1106):

(vii) a Y-coordinate of the pop-up screen 99 upon performing the mouse-up; and (viii) a coordinate obtained by subtracting the height of the pop-up screen 99 from the Y-coordinate of the lower end of the displayable area 97.

Figure 13B:
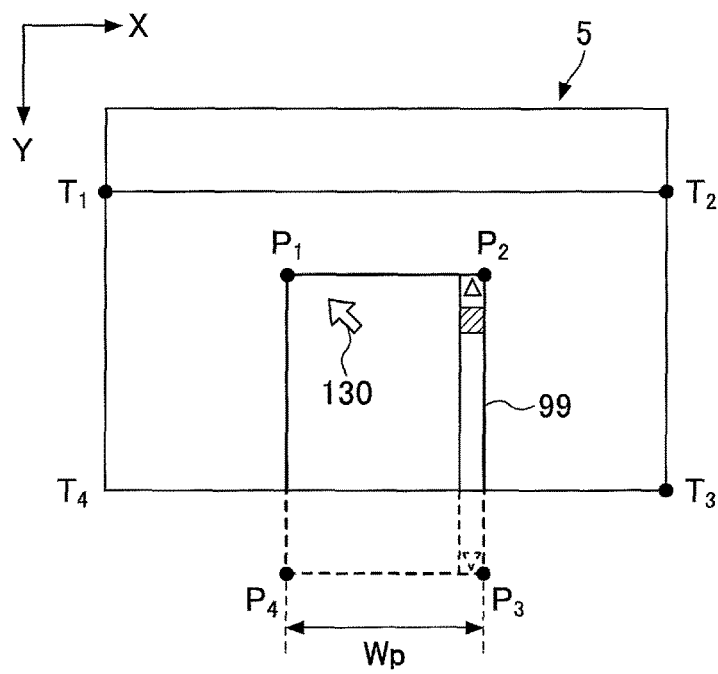

The process will be explained with reference to FIG. 13B. In FIG. 13B, the pop-up screen 99 is moved beyond the lower end of the displayable area 97. In this case, in order for the pop-up screen 99 to enter the displayable area 97, the Y-coordinate of the upper-left corner P1 is required to be on the upper side of the displayable area 97 by the height of the pop-up screen 99. In the example of FIG. 13B, the coordinate obtained by subtracting the height of the pop-up screen 99 from the Y-coordinate of the lower end of the displayable area 97 is smaller than the Y-coordinate of the upper-left corner P1 of the pop-up screen 99 upon performing the mouse-up. Therefore, the UI generation unit 63 or the UI control unit 42 sets the Y-coordinate of the upper-left corner P1 of the pop-up screen 99 to the coordinate obtained by subtracting the height of the pop-up screen 99 from the Y-coordinate of the lower end of the displayable area 97.

Meanwhile, in a case where the pop-up screen 99 does not go over the lower end of the displayable area 97, the process is as follows. The Y-coordinate of the upper-left corner P1 of the pop-up screen 99 upon performing the mouse-up is smaller than the coordinate obtained by subtracting the height of the pop-up screen 99 from the Y-coordinate of the lower end of the displayable area 97. Therefore, the Y-coordinate of the upper-left corner P1 of the pop-up screen 99 upon performing the mouse-up is employed.

Meanwhile, in relation to Step S1104, a smaller one of the Y-coordinates of the upper-left corner P1 set in Step S1104 and in Step S1106 is employed.

The UI generation unit 63 of the UI control unit 42 displays a lock-up screen to the X-coordinate and the Y-coordinate of the upper-left corner P1 of the pop-up screen 99 which are determined as above (step S1107).

<<Position of the Pop-Up Screen after Movement>>

FIGS. 14A to 14D are diagrams for schematically explaining an example of a relation between the position of the pop-up screen 99 upon performing the mouse-up and the position of the pop-up screen 99 displayed on the UI 5.

In FIG. 14A, the pop-up screen 99 upon performing the mouse-up goes over the left end of the displayable area 97. In this case, by the process in Step S1103 in FIG. 11, the pop-up screen 99 is displayed so that a left end of the pop-up screen 99 contacts the left end of the displayable area 97. The Y-coordinate remains the coordinate upon performing the mouse-up according to the processes in Steps S1104 and S1106 in FIG. 11.

In FIG. 14B, the pop-up screen 99 upon performing the mouse-up goes over the upper end of the displayable area 97. In this case, by the process in Step S1104 in FIG. 11, the pop-up screen 99 is displayed so that an upper end of the pop-up screen 99 contacts the upper end of the displayable area 97. The X-coordinate remains the coordinate upon performing the mouse-up according to the processes in Steps S1103 and S1105 in FIG. 11.

In FIG. 14C, the pop-up screen 99 upon performing the mouse-up goes over the right end of the displayable area 97. In this case, by the process in Step S1105 in FIG. 11, the pop-up screen 99 is displayed so that a right end of the pop-up screen 99 contacts the right end of the displayable area 97. The Y-coordinate remains the coordinate upon performing the mouse-up according to the processes in Steps S1104 and S1106 in FIG. 11.

In FIG. 14D, the pop-up screen 99 upon performing the mouse-up goes over the lower end of the displayable area 97. In this case, by the process in Step S1106 in FIG. 11, the pop-up screen 99 is displayed so that a lower end of the pop-up screen 99 contacts the lower end of the displayable area 97. The X-coordinate remains the coordinate upon performing the mouse-up according to the processes in Steps S1103 and S1105 in FIG. 11.

FIGS. 15A to 15D are diagrams for schematically explaining another example of the relation between the position of the pop-up screen 99 upon performing the mouse-up and the position of the pop-up screen 99 displayed on the UI 5.

In FIG. 15A, the pop-up screen 99 upon performing the mouse-up goes over the upper end and the left end of the displayable area 97. In this case, by the processes in Steps S1103 and S1104 in FIG. 11, the pop-up screen 99 is displayed so that the upper end of the pop-up screen 99 contacts the upper end of the displayable area 97 and that the left end of the pop-up screen 99 contacts the left end of the displayable area 97.

In FIG. 15B, the pop-up screen 99 upon performing the mouse-up goes over the upper end and the right end of the displayable area 97. In this case, by the processes in Steps S1105 and S1106 in FIG. 11, the pop-up screen 99 is displayed so that the upper end of the pop-up screen 99 contacts the upper end of the displayable area 97 and that the right end of the pop-up screen 99 contacts the right end of the displayable area 97.

In FIG. 15C, the pop-up screen 99 upon performing the mouse-up goes over the lower end and the left end of the displayable area 97. In this case, by the processes in Steps S1103 and S1106 in FIG. 11, the pop-up screen 99 is displayed so that the lower end of the pop-up screen 99 contacts the lower end of the displayable area 97 and that the left end of the pop-up screen 99 contacts the left end of the displayable area 97.

In FIG. 15D, the pop-up screen 99 upon performing the mouse-up goes over the lower end and the right end of the displayable area 97. In this case, by the processes in Steps S1104 and S1106 in FIG. 11, the pop-up screen 99 is displayed so that the lower end of the pop-up screen 99 contacts the lower end of the displayable area 97 and that the right end of the pop-up screen 99 contacts the right end of the displayable area 97.

As shown in FIGS. 14A to 15D, even if the operator 26 moves the pop-up screen 99 to the outside of the displayable area 97, the pop-up screen 99 is displayed only in the displayable area 97. The pop-up screen 99 neither overlaps the screen transition menu display area 12, nor goes over an outer edge of the various information display area 13. Therefore, the pop-up screen 99 does not hide the present status display area 11, and the operator 26 can constantly perceive the present status of the image forming apparatus 31

<Regarding Enlarged Present Status Display Area 11>

Figure 16A:
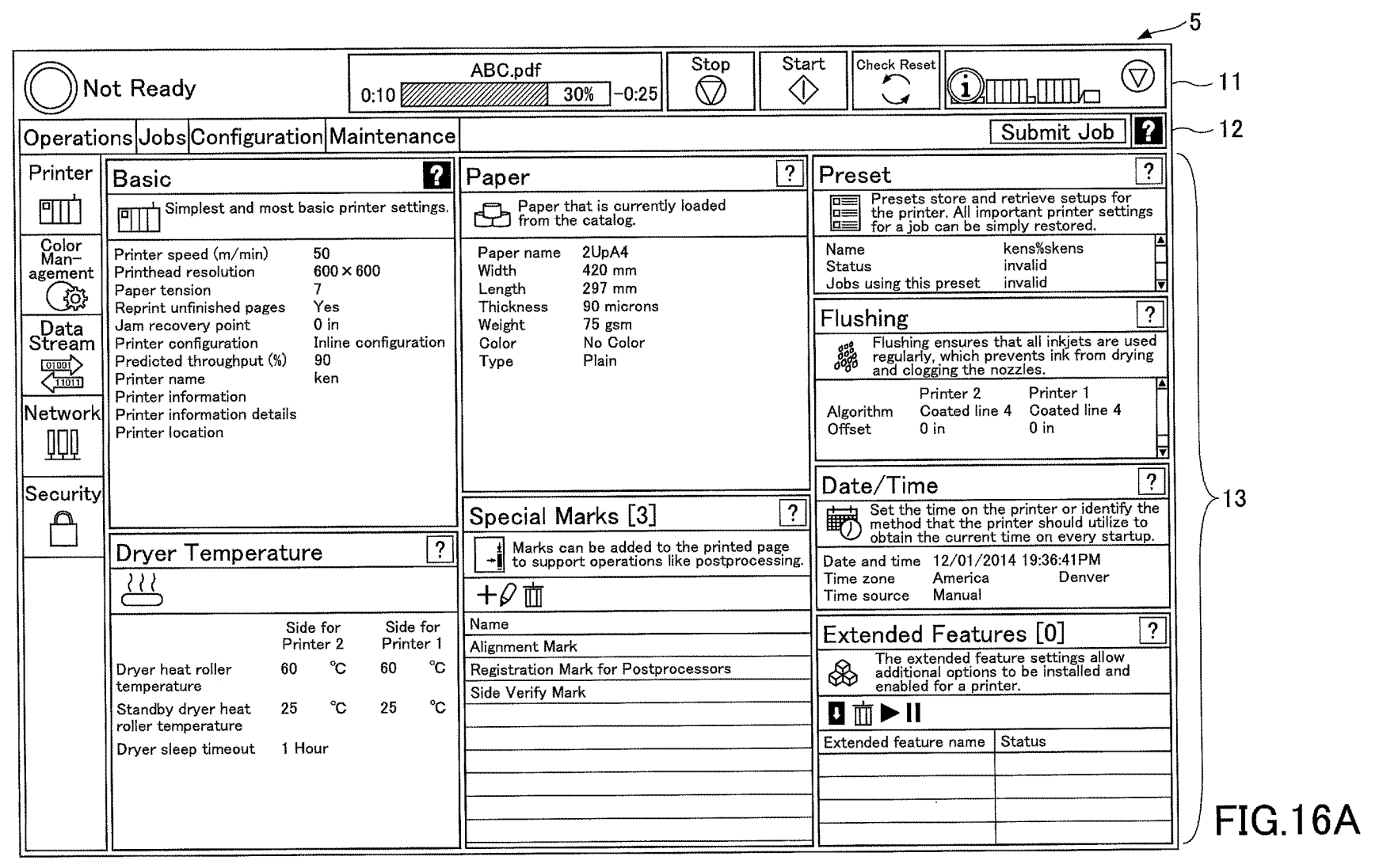

Next, the present status display area 11 which is displayed enlarged will be explained with reference to FIGS. 16A to 16C. FIGS. 16A to 16C are diagrams for schematically explaining an example of a transition of the present status display area 11. FIG. 16A illustrates the present status display area 11 in a normal state.

In the present status display area 11 in the normal state, in a case where an error occurs in the image forming apparatus 31, the UI generation unit 63 of the UI control unit 42 enlarges and displays the present status display area 11. FIG. 16B illustrates an enlarged part 14 of the present status display area 11 during a process of the enlarged display from the normal state. As shown in FIG. 16B, the enlarge part 14 of the present status display area 11 is displayed so as to extend downwardly from the present status display area 11.

FIG. 16C illustrates an example of the present status display area 11 in which the enlarged display is completed.

The enlarged part 14 of the present status display area 11 includes an icon region 95, a message region 94 and a paper tray region 93. The enlarged part 14 is an example of an enlarged region.

The icon region 95 displays a refined apparatus icon 95a for the image forming apparatus 31 and a remaining amount of toner (ink) 95b. The refined apparatus icon 95a indicates an error occurrence location in red or the like. Moreover, in a case of an out-of-toner (ink), color of the toner (ink) which becomes less than a predetermined amount is highlighted by blinking or the like. FIG. 16C illustrates eight paper trays, to which numbers of 1 to 8 are assigned respectively (with reference numerals 81 to 88). Then, since the paper tray 87 is indicated in red, the operator 26 perceives at a glance the paper tray which runs out of paper.

The message region 94 displays a specific content of the error with a message (characters or symbols) 94a. In the example shown in FIGS. 16A to 16C, a message 94a "paper tray 7 (reference numeral 87) runs out of paper" is displayed. Therefore, the operator 26 can perceive surely specific contents of the error that is perceived from the refined apparatus icon 95a.

The paper tray region 93 displays paper tray information including the numbers 1 to 8 of the paper trays and types of placed papers. Moreover, a paper tray that runs out of paper is highlighted in red or the like. The operator does not always remember the type of paper of the paper tray running out of paper which the operator perceives from the refined apparatus icon 95a. By referring the paper tray region 93, the operator 26 can confirm the type of paper to be resupplied.

The refined apparatus icon 95a, the remaining amount of toner (ink) 95b, the message 94a and the paper tray information 93a are examples of warning information.

According to the present status display area 11 displayed enlarged as above, the operator 26 can perceive immediately that some error occurs. For example, in a case where the operator 26 leaves the seat while the present status display area 11 in the normal state is displayed, the present status display area 11 is displayed enlarged and the operator 26 can perceive that an error occurs even from a long distance.

Moreover, in a case where the operator 26 leaves the seat while the present status display area 11 is displayed enlarged, when an error occurs, an error occurrence location in the refined apparatus icon is highlighted, and the operator 26 can perceive that an error occurs even from a long distance.

Meanwhile, the displaying of the present status display area 11 upon the occurrence of error, explained with reference to FIGS. 16A to 16C is an example. The enlarged part 14 of the present status display area 11 may be moved from right, left or below, not descending from above. Moreover, in the case of occurrence of error, a frame 89 may be highlighted in red or the like, or may blink to be displayed.

<In Case of Occurrence of Error while Displaying the Pop-Up Screen 99>

In a case where an error occurs while the pop-up screen 99 is displayed, since the present status display area 11 is displayed enlarged, the pop-up screen 99 may not fit within the displayable area 97. In this case, although most of the operators 26 give priority to handling the occurrence of error, there are operators 26 who give priority to processing the pop-up screen 99 (for example, in a case where editing the pop-up screen 99 is completed in a short time).

Then, in the present embodiment, the present status display area 11 is displayed enlarged in a mode corresponding to setting of the operator 26 while the pop-up screen 99 is displayed. The setting is stored in the setting holding unit 68. The setting holding unit 68 is an example of a setting information storage means, and the setting of the operator 26 is an example of setting information.

Figure 17A:
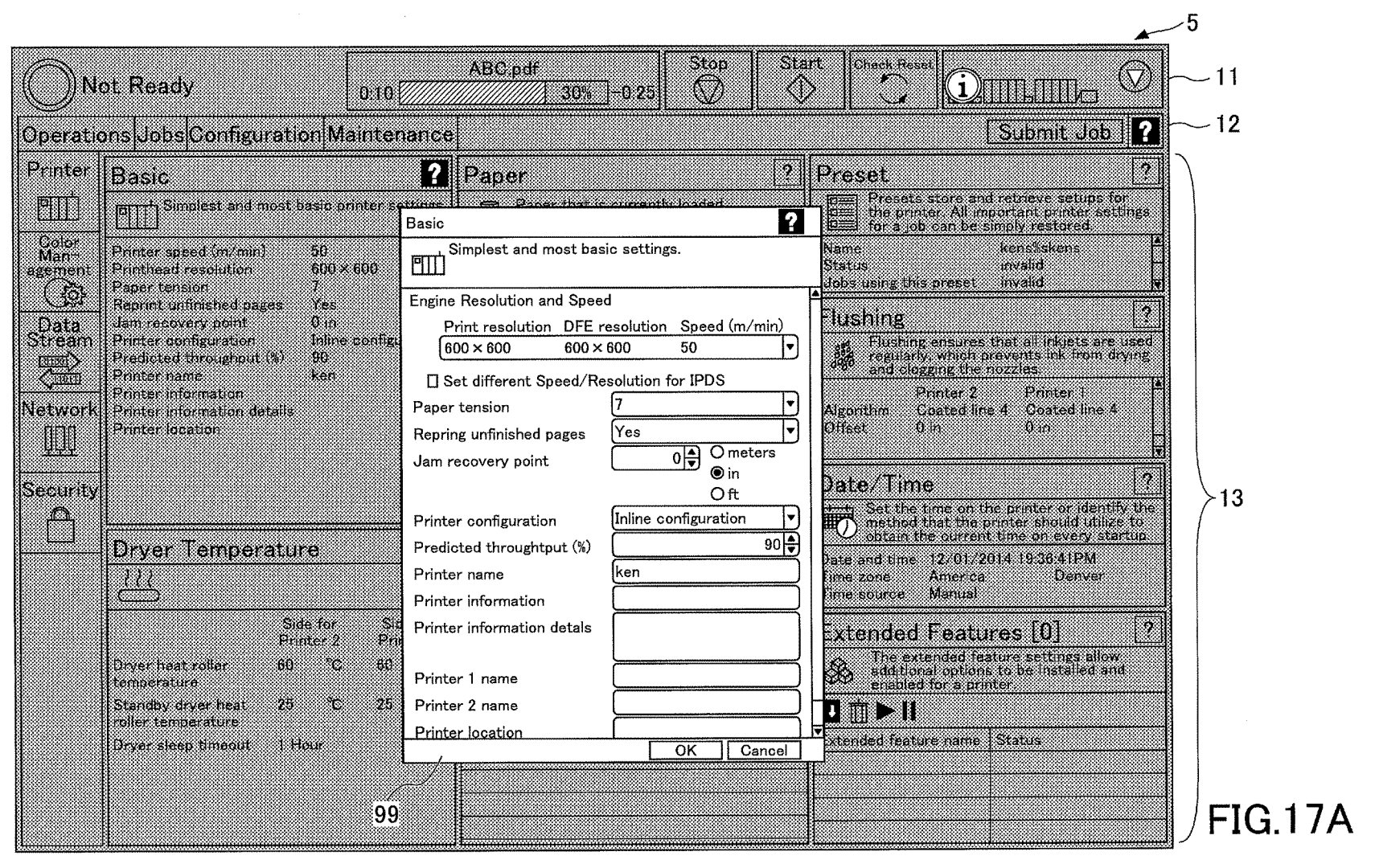
Figure 17B:
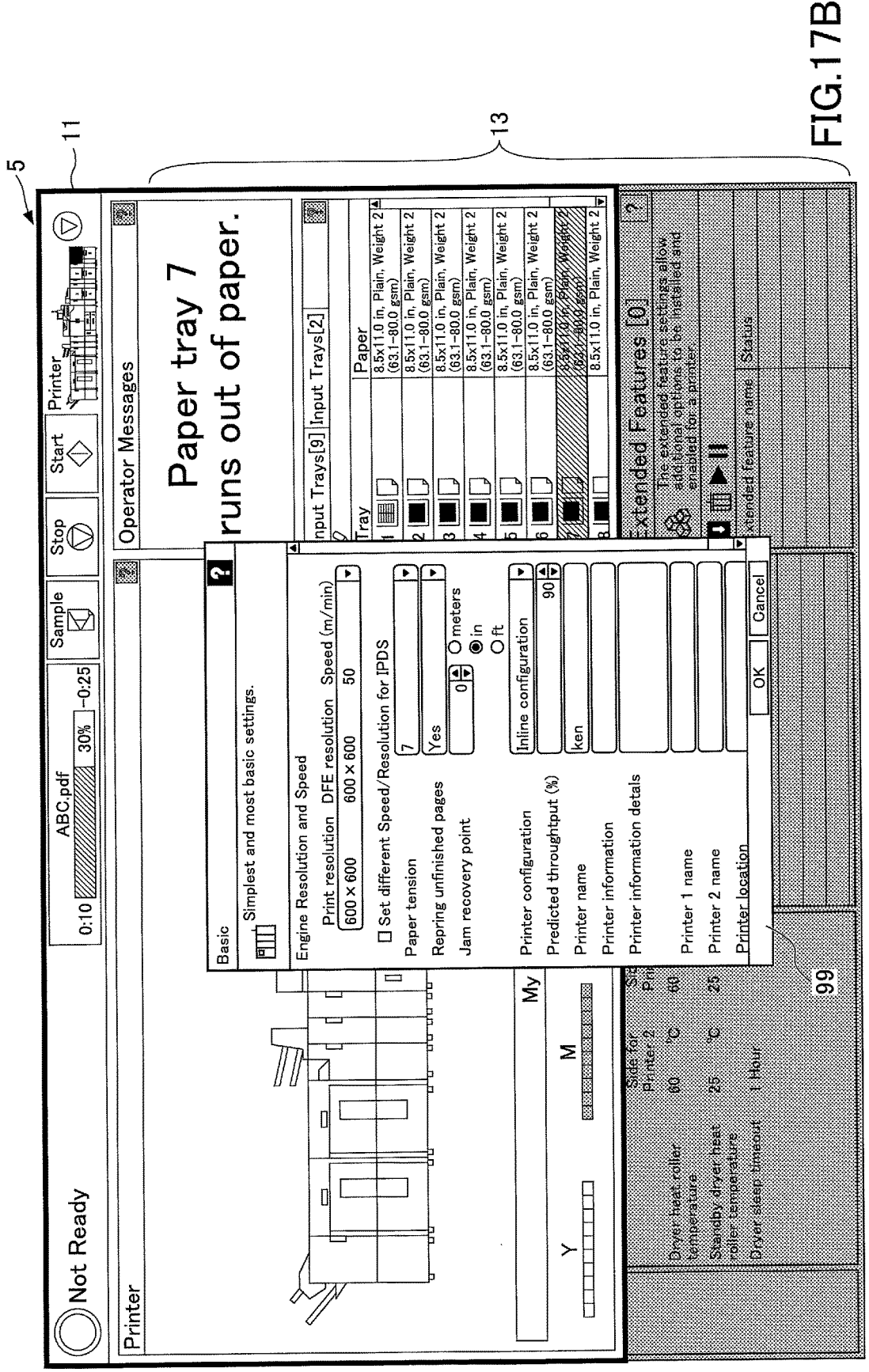
Figure 17C:
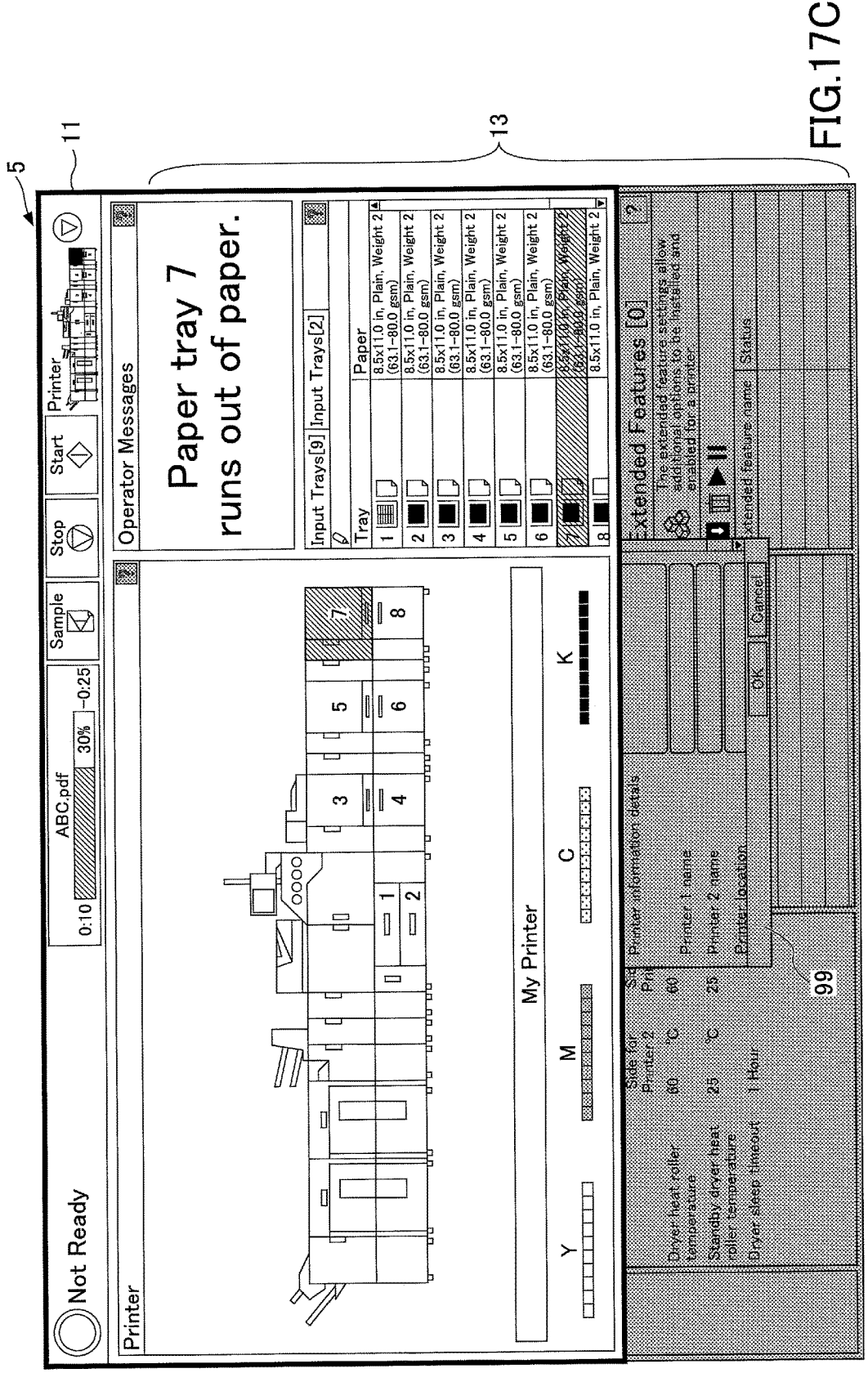

FIGS. 17A to 17C are diagrams illustrating an example of the present status display area 11 displayed enlarged while the pop-up screen is displayed. As shown in FIG. 17A, the operator 26 displays the pop-up screen and performs an editing operation. Assume that an error occurs in this state.

(Case where the Operator 26 Sets to Give Priority to the Pop-Up Screen 99)

FIG. 17B is a diagram illustrating an example of the present status display area 11 displayed enlarged in the case where the operator 26 sets to give priority to the pop-up screen 99. Since the pop-up screen 99 is given priority over the enlarged part 14 of the present status display area 11, the enlarged part 14 of the present status display area 11 is displayed behind the pop-up screen 99. Therefore, the operator 26 can continue the editing operation without being interrupted.

(Case where the Operator 26 Sets to Give Priority to the Present Status Display Area 11)

FIG. 17C is a diagram illustrating an example of the present status display area 11 displayed enlarged in the case where the operator 26 sets to give priority to the present status display area 11. Since the enlarged part 14 of the present status display area 11 is given priority over the pop-up screen 99, the enlarged part 14 of the present status display area 11 is displayed on an upper side (a front side, a side of the viewpoint of the operator). Therefore, even in a case where the operator 26 performs the editing operation (or in a case where the operator 26 leaves the seat while the pop-up screen 99 is displayed), the operator 26 can conceive a content of the error.

<<Procedure of Displaying the Enlarged Present Status Display Area 11>>

FIG. 18 is a sequence diagram illustrating an example of a procedure of the print system 200 for displaying the enlarged present status display area 11. Meanwhile, the display device 23 or the monitor 24 is assumed to display the present status display area 11, the screen transition menu display area 12 and the various information display area 13.

First, the printer control unit 49 periodically communicates with the image forming apparatus 31, and sends acquired device status information Di to the system control unit 46 (step S1801). The device status information Di is assumed to include error content.

The system control unit 46 passes the device status information Di to the Web server function provision unit 43 (step S1802). Meanwhile, the system control unit 46 may analyze the device status information Di to identify an error occurrence location.

The Web server function provision unit 43 analyzes the device status information Di to identify the error occurrence location (step S1803). Then, based on the error occurrence location, a refined apparatus icon 95a, a message 94a and paper tray information 93a are generated. That is, a part of the refined apparatus icon 95a corresponding to the error occurrence location is changed to red or the like. Moreover, a message 94a associated with the error occurrence location is acquired from a table in which error occurrence locations are associated with messages in advance. Moreover, color of a paper tray in the paper tray region 93 corresponding to the error occurrence location is changed to red or the like and the paper tray information 93a is generated. The above described pieces of information are parts of the UI information. Meanwhile, the present status generation unit 64 of the PC server 21 may generate the refined apparatus icon 95a, the message 94a and the paper tray information 93a.

The Web server function provision unit 43 passes the UI information generated in Step S1803 to the transmission/reception unit 44 (Step S1804).

The transmission/reception unit 44 of the DFE 32 sends the UI information to the transmission/reception unit 61 of the PC server 21 (Step S1805).

The transmission/reception unit 61 of the PC server 21 passes the UI information to the present status generation unit 64 (step S1806).

The present status generation unit 64 generates an enlarged part 14 of the present status display area 11 (Step S1807). That is, the refined apparatus icon 95a is arranged in an icon region 95 in the enlarged part 14 of the present status display area 11, the message 94a is arranged in a message region 94, and the paper tray information 93a is arranged in the paper tray region 93.

The present status generation unit 64 passes the enlarged part 14 of the present status display area 11 to the UI generation unit 63 (Step S1808).

The UI generation unit 63 displays the enlarged part 14 of the present status display area 11 on the UI 5 (Step S1809). The process in Step S1809 will be explained with reference to FIG. 19.

Meanwhile, although FIG. 18 illustrates the operation procedure of the PC server 21, the procedure of the DFE 32 for displaying the UI 5 may be passing the UI information to the UI control unit 42 by the Web server function provision unit 43.

FIG. 19 is a flowchart illustrating an example of a procedure of the UI generation unit 63 for displaying the enlarged part 14 of the present status display area 11 on the UI 5.

First, the UI generation unit 63 determines whether the pop-up screen 9 is being displayed (step S1901).

In a case where the pop-up screen 99 is not displayed (Step S1901: NO), the UI generation unit 63 displays the enlarged part 14 of the present status display area 11 (Step S1905).

In a case where the pop-up screen 99 is displayed (Step S1901: YES), the UI generation unit 63 refers to the setting holding unit 68 to determine whether the operator 26 sets to give priority to the pop-up screen 99 (Step S1902).

In a case where the operator 26 sets to give priority to the pop-up screen 99 (Step S1902: YES), the UI generation unit 63 displays the enlarged part 14 of the present status display area 11, and thereafter displays the pop-up screen 99 (Step S1903). According to the above-described processes, the pop-up screen 99 is displayed on the foremost side.

In a case where the operator 26 does not set to give priority to the pop-up screen 99 (Step S1902: NO), the UI generation unit 63 displays the enlarged part 14 of the present status display area 11 in front of the pop-up screen 99 (Step S1904). According to the above-described processes, the enlarged displayed present status display area 11 is displayed on the foremost side.

As described above, in the print system 200 according to the present embodiment, since the pop-up screen 99 does not overlap the present status display area 11, the operator can constantly perceive present status of the image forming apparatus 31. Since the operator also cannot cause the pop-up screen 99 to overlap the present status display area 11 by his/her own operations, there is no possibility of the present status display area 11 being hidden by mistake. Moreover, in a case where an error occurs while the pop-up screen 99 is displayed, since the pop-up screen 99 or the present status display area 11 can be displayed as priority according to setting by the user, the displaying can be changed in the operator's preference.

The UI disclosed in Japanese Patent No. 4895613 has a problem that the pop-up screen overlaps the basic screen.

Figure 20A:
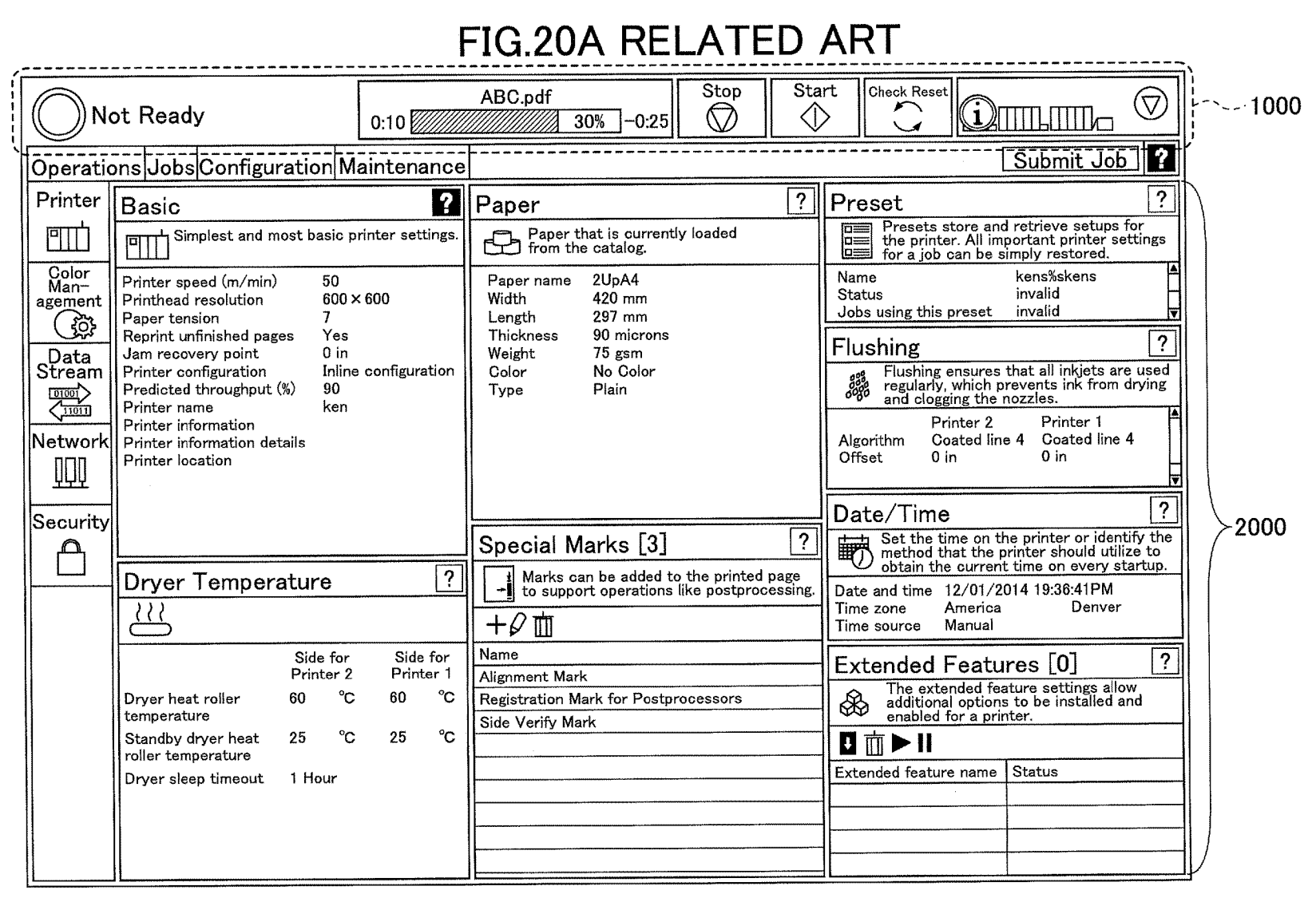
Figure 20B:
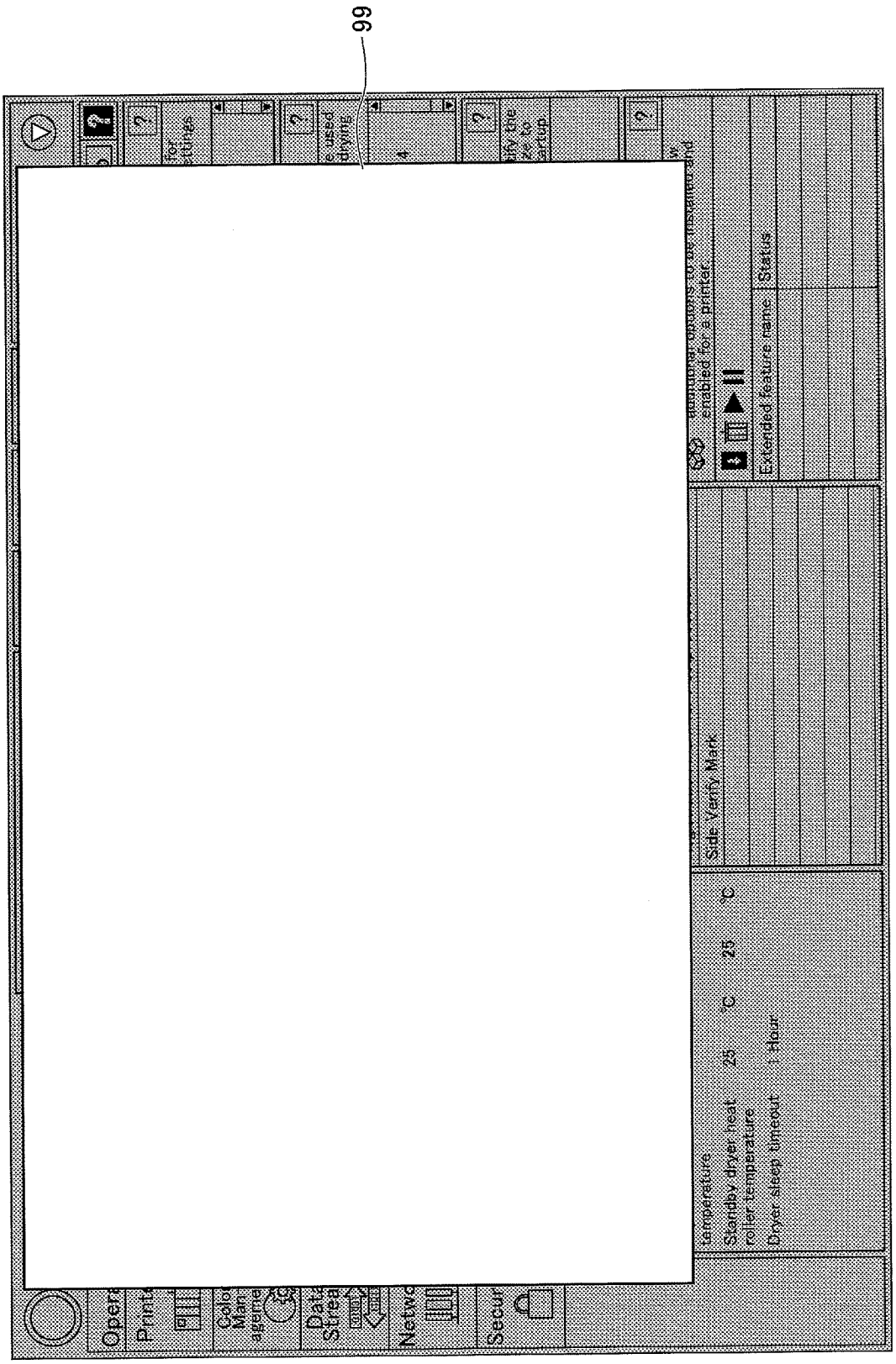

The above-described problem in an image forming apparatus for commercial printing will be explained with reference to FIGS. 20A and 20B. FIGS. 20A and 20B are diagrams for explaining an example of inconvenience by the pop-up screen. First, in the image forming apparatus for commercial printing, it is important to display a present status of the image forming apparatus on the UI for the operator. The operator preferably always perceives whether the image forming apparatus is in a state of being executable for printing at present, since for commercial printing the productivity of the image forming apparatus is directly linked to business benefits.

Accordingly, in the image forming apparatus for commercial printing, as shown in FIG. 20A, a partition 1000 dedicated for displaying status is arranged in a predetermined partition of the UI, and information such as a list of printing jobs is displayed in a partition 2000 other than the dedicated partition 1000. Since the partition 1000 dedicated for displaying status always displays the status of the image forming apparatus, the operator can always perceive the present status of the image forming apparatus or the like.

However, in a case where the operator causes the pop-up screen 99 to appear in the above-described UI in order to display or input additional information related to the partition 2000 other than the dedicated partition, the pop-up screen 99 may overlap the partition 1000 dedicated for displaying the status, as shown in FIG. 20B. In a case where the operator is concentrated on display contents of the pop-up screen 99 or inputting, it may be difficult to find a change in the status of the image forming apparatus in the partition 1000 dedicated for displaying status. Moreover, even when the operator does not operate using the pop-up screen 99, in a case where the operator leaves the image forming apparatus while displaying the pop-up screen 99, the operator cannot monitor the status of the apparatus, and is difficult to find a change in the status of the image forming apparatus.

According to the present embodiment, an information processing apparatus that can constantly display status of an image forming apparatus can be provided.

<Other Example to which Present Embodiment is Applied>

As described above, the best mode for working of the present invention is explained with reference to the embodiments. However, the present invention is not limited to these embodiments, but various variations and modifications may be made without departing from the scope of the present invention.

For example, in the present embodiments, the DFE 32 includes the Web server function provision unit 43. However, the Web server function provision unit 43 may be arranged separately from the DFE 32.

Moreover, in a state where the enlarged part 14 of the present status display area 11 is already displayed, displaying the pop-up screen 99 by the operator may be prevented or may not be prevented. In a case of not being prevented, the extended part 14 or the pop-up screen 99 is preferentially displayed according to the setting of the setting holding unit 68. Or, the pop-up screen 99 may be given priority regardless of the setting of the setting holding unit 68.

Moreover, as an example of the UI 5, the screen transition menu display area 12 and the various information display area 13 are separately shown. However, they may not be distinguished from each other. Moreover, the UI 5 may not include the screen transition menu display area 12.

Moreover, in the present embodiment, various pieces of information in the various information display area 13 are displayed as pop-up screens. But, the information of the present status display area 11 may be displayed as a pop-up screen. In this case, generally the pop-up screen does not overlap the present status display area 11. However, exceptionally, in a case where the pop-up screen includes all pieces of information of the present status display information 11 (or the status display part 101, the job information display part 102, the information display part 106 and the device icon unit 107, which indicate the present status), the pop-up screen may overlap the present status display area 11.

Moreover, information displayed as the pop-up screen 99, may be information which is not displayed in the various information display area 13 or may be information irrelevant to various pieces of information displayed in the various information display area 13.

Moreover, in the present embodiment, production printing is explained as an example. But, it is possible to apply the present invention to a UI used by an individual user, such as a UI for an image forming apparatus, a scanner, a copier or a facsimile machine.

What is claimed is:

1. An information processing apparatus, comprising:
    an acquisition unit configured to acquire status information of an image forming apparatus;
    an information display unit configured to constantly display the status information of the image forming apparatus in a first region on a display device, to display setting information regarding image processing to be performed in the image forming apparatus in a second region on the display device, the second region being adjacent to the first region, and to display a relation display element related to the setting information; and
    a pop-up screen generation unit configured to acquire ideal setting values for height and width for a size of a screen that can display all relation setting information related to the setting information displayed in the second region by the information display unit, to calculate values for height and width for a greatest size that the screen can display in the second region displayed by the information display unit, and to reduce the size of the screen when the size is greater than the greatest size to prevent overlapping the relation display element with the first region.

2. The information processing apparatus according to claim 1 further comprising:
    an operation reception unit configured to receive an operation regarding display of the relation display element,
    wherein in a case where the operation reception unit receives an operation to change the position of the relation display element, the information display unit is configured to display the relation display element at a position so that the relation display element does not overlap the first region and does not run off an outer edge of the second region.

3. The information processing apparatus according to claim 2,
    wherein the operation reception unit is configured to allow the relation display element to overlap the first region or run off the outer edge of the second region until receiving a final position of the relation display element, and in a case where the operation reception unit receives an operation to change the position of the relation display element to the final position, the information display unit is configured to display the relation display element at a position so that the relation display element does not overlap the first region and does not run off the outer edge of the second region.

4. The information processing apparatus according to claim 2, wherein after the operation reception unit receives an operation to display the relation display element, the information display unit is configured to display the relation display element at a center of the second region.

5. The information processing apparatus according to claim 2, wherein in a case where the relation display element is at a position where the relation display element runs off the outer edge of the second region upon the operation reception unit receiving a final position of the relation display element, the information display unit is configured to display the relation display element at a position so that the relation display element is inside the second region and is nearest to the relation display element at the position upon the operation reception unit receiving the final position of the relation display element, or to display the relation display element at a center of the second region.

6. The information processing apparatus according to claim 1, wherein in a case where the status information of the image forming apparatus includes a predetermined status of the image forming apparatus, the information display unit is configured to display warning information in an extended region which is extended from the first region and overlaps the second region.

7. The information processing apparatus according to claim 6, wherein the warning information includes a first icon a shape of which is obtained by imitating an appearance of the image forming apparatus, and a part of the first icon corresponding to a part of the image forming apparatus which is in the predetermined status is highlighted.

8. The information processing apparatus according to claim 6, wherein in a case where the relation display element has been displayed upon the extended region being displayed, the information display unit is configured to overlap the extended region over the relation display element.

9. The information processing apparatus according to claim 6, wherein in a case where the relation display element has been displayed upon the extended region being displayed, the information display unit is configured to overlap the relation display element over the extended region.

10. The information processing apparatus according to claim 6 further comprising:

a priority setting information storage unit configured to store priority setting information that sets which of the extended region and the relation display element is given priority, wherein in a case where the relation display element has been displayed upon the extended region being displayed, the information display unit is configured to determine whether to overlap the relation display element over the extended region or to overlap the extended region over the relation display element based on the priority setting information.

11. The information processing apparatus according to claim 1, wherein the status information of the image forming apparatus displayed in the first region includes information indicating a present status of the image forming apparatus.

12. The information processing apparatus according to claim 11, wherein the status information of the image forming apparatus displayed in the first region includes a second icon a shape of which is obtained by imitating an appearance of the image forming apparatus, and a part of the second icon corresponding to a part of the image forming apparatus which is in a predetermined status is highlighted.

13. The information processing apparatus according to claim 10, wherein the status information of the image forming apparatus displayed in the first region includes a third icon configured to indicate that a print condition set for the image forming apparatus is different from a predetermined print condition.

14. The information processing apparatus according to claim 10, wherein the information display unit is configured to display at least one of a button for receiving an operation to stop the image forming apparatus from receiving print jobs, a button for receiving an operation for the image forming apparatus to restart receiving print jobs after the image forming apparatus stops receiving the print jobs and a button for receiving an operation to erase a record of an error occurring in the image forming apparatus, in addition to the status information of the image forming apparatus, in the first region.

15. The information processing apparatus according to claim 1, wherein when the size of the screen is reduced, a scroll bar is provided and the relation setting information is displayed by the scroll bar.

16. A non-transitory computer-readable storage medium storing a program for causing a computer of an information processing apparatus to execute a process of constantly displaying on a display device status information of an image forming apparatus, the process comprising:

acquiring the status information of the image forming apparatus;

displaying constantly the status information of the image forming apparatus in a first region on the display device;

displaying setting information regarding image processing to be performed in the image forming apparatus in a second region on the display device, the second region being adjacent to the first region;

displaying a relation display element related to the setting information;

acquiring ideal settings values for height and width for a size of a screen that can display all relation setting information related to the setting information related to the setting information displayed in the second region;

calculating values for height and width for a greatest size that the screen can display in the second region; and
reducing the size of the screen when the size is greater than the greatest size to prevent overlapping the relation display element with the first region.

17. A user interface for constantly indicating status information of an image forming apparatus, comprising:
a first display element, in which setting information regarding image processing to be performed in the image forming apparatus is displayed;
a second display element, in which the status information of the image forming apparatus is constantly displayed;
a third display element, which is related to the setting information displayed in the first display element, and is displayed overlapped with the first display element but not overlapped with the second display element; and
a pop-up screen generation unit configured to acquire ideal setting values for height and width for a size of a screen for the third display element, to calculate values for height and width for a greatest size that the screen can display for the third display element, and to reduce the size of the screen for the third display element to prevent overlapping with the second display element.

18. The user interface according to claim 17, wherein in a case where the third display element is instructed to be displayed at a position where the third display element overlaps the second display element, the third display element is moved to and displayed at a position so that the third display element does not overlap the second display element.

* * * * *